US011276091B2

(12) United States Patent
Lu et al.

(10) Patent No.: US 11,276,091 B2
(45) Date of Patent: Mar. 15, 2022

(54) INFORMATION PROCESSING METHOD AND DEVICE AND STORAGE MEDIUM

(71) Applicant: Tencent Technology (Shenzhen) Company Limited, Shenzhen (CN)

(72) Inventors: Zhiyong Lu, Shenzhen (CN); Wenxin Chen, Shenzhen (CN); Xi Xiong, Shenzhen (CN); Ningguo Chen, Shenzhen (CN); Qiang Fei, Shenzhen (CN); Xunmao Zheng, Shenzhen (CN); Songjian Wang, Shenzhen (CN); Jianwei Deng, Shenzhen (CN); Wuling Qin, Shenzhen (CN); Yi Ding, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 176 days.

(21) Appl. No.: 16/357,119

(22) Filed: Mar. 18, 2019

(65) Prior Publication Data

US 2019/0213648 A1    Jul. 11, 2019

Related U.S. Application Data

(63) Continuation of application No. PCT/CN2018/080844, filed on Mar. 28, 2018.

(30) Foreign Application Priority Data

Apr. 5, 2017 (CN) .......................... 201710218405.6
Apr. 25, 2017 (CN) .......................... 201710278587.6

(51) Int. Cl.
*G06Q 30/04* (2012.01)
*H04L 12/58* (2006.01)
(Continued)

(52) U.S. Cl.
CPC ............. *G06Q 30/04* (2013.01); *G06Q 20/40* (2013.01); *G06Q 30/06* (2013.01); *H04L 51/046* (2013.01); *H04L 67/303* (2013.01); *H04L 67/42* (2013.01)

(58) Field of Classification Search
CPC ........ G06Q 30/04; G06Q 20/40; G06Q 30/06; G06Q 20/385; G06Q 20/123; G06Q 20/102; H04L 51/046; H04L 67/303; H04L 67/42
See application file for complete search history.

(56) References Cited

U.S. PATENT DOCUMENTS 9,636,573 B1 * 5/2017 Schultz .................. A63F 13/35
9,721,284 B1 * 8/2017 Wakeford .......... G06Q 30/0601
(Continued)

FOREIGN PATENT DOCUMENTS

CN    101064029 A    10/2007
CN    101459908 A    6/2009
(Continued)

OTHER PUBLICATIONS

Stefferud, Einar. Looking back at the First Virtual Payment System for Clues about the Virtual Goods Business Model and its Technical Requirements. Retrieved from <http://virtualgoods.org//2003/FirstVirtual.pdf> on Dec. 15, 2020. Originally published 2003. (Year: 2003).*

(Continued)

*Primary Examiner* — Nathan A Mitchell
(74) *Attorney, Agent, or Firm* — Morgan, Lewis & Bockius LLP

(57) ABSTRACT

This application discloses an information processing method performed at an application server. The application server receives a first virtual article identifier and a first account sent by a terminal in response to an operation of a user on (Continued)

a virtual article presentation interface. The server generates and stores a first order including the first virtual article identifier and the first account, obtains a current bill provided by a payment system and forwarded by the terminal, and a second account used to log into the terminal. The server determines a second order corresponding to the current bill, associates the current bill with the second order when a virtual article identifier and an account in the second order are the same as the second virtual article identifier and the second account; and sends a virtual article corresponding to the second virtual article identifier to the second account.

20 Claims, 16 Drawing Sheets

(51) Int. Cl.
*G06Q 20/40* (2012.01)
*G06Q 30/06* (2012.01)
*H04L 29/08* (2006.01)
*H04L 29/06* (2006.01)
*H04L 51/046* (2022.01)
*H04L 67/303* (2022.01)
*H04L 67/01* (2022.01)

(56) References Cited

U.S. PATENT DOCUMENTS

| | | | | |
|---|---|---|---|---|
| 9,892,436 | B1* | 2/2018 | Gannon | G06Q 30/0601 |
| 2004/0054611 | A1 | 8/2004 | Franks et al. | |
| 2005/0027543 | A1* | 2/2005 | Labrou | G06Q 20/12 |
| | | | | 705/26.35 |
| 2009/0112359 | A1* | 4/2009 | Sanguinetti | G06Q 10/08 |
| | | | | 700/228 |
| 2009/0119188 | A1* | 5/2009 | Pagan | G06Q 30/0601 |
| | | | | 705/26.1 |
| 2009/0144633 | A1* | 6/2009 | Schultz | G06Q 20/40 |
| | | | | 715/742 |
| 2010/0222139 | A1* | 9/2010 | Wang | G06Q 30/08 |
| | | | | 463/29 |
| 2012/0109827 | A1 | 5/2012 | Otterström | |
| 2012/0330785 | A1* | 12/2012 | Hamick | G06Q 30/06 |
| | | | | 705/26.41 |
| 2014/0081873 | A1* | 3/2014 | Xia | G06Q 20/12 |
| | | | | 705/71 |
| 2015/0100476 | A1* | 4/2015 | Agapitov | A63F 13/30 |
| | | | | 705/39 |
| 2015/0186994 | A1* | 7/2015 | He | G06Q 20/4014 |
| | | | | 705/44 |
| 2015/0332244 | A1* | 11/2015 | Zhang | G06Q 20/22 |
| | | | | 705/39 |
| 2016/0117656 | A1* | 4/2016 | Xu | G06Q 20/102 |
| | | | | 705/34 |
| 2016/0234302 | A1* | 8/2016 | Wu | H04L 67/06 |
| 2016/0253731 | A1* | 9/2016 | Ketchel, III | G06Q 20/10 |
| | | | | 705/26.5 |
| 2018/0114240 | A1* | 4/2018 | Zhang | G06Q 30/0212 |
| 2018/0349870 | A1* | 12/2018 | Sudo | G06Q 20/16 |
| 2019/0238488 | A1* | 8/2019 | Peng | H04L 51/10 |

FOREIGN PATENT DOCUMENTS

| | | |
|---|---|---|
| CN | 104348792 A | 2/2015 |
| CN | 104539662 A | 4/2015 |
| CN | 104978653 A | 10/2015 |
| CN | 105453124 A | 3/2016 |
| CN | 105956892 A | 9/2016 |
| CN | 107016598 A | 8/2017 |

OTHER PUBLICATIONS

Huang, X., Dai, X. & Liang, W. BulaPay: a novel web service based third-party payment system for e-commerce. Electron Commer Res 14, 611-633 (2014). https://doi.org/10.1007/s10660-014-9172-1 (Year: 2014).*

Tencent Technology, ISR, PCT/CN2018/080844, Jul. 19, 2018, 2 pgs.

Tencent Technology, Written Opinion, PCT/CN2018/080844, dated Jul. 3, 2018, 6 pgs.

Tencent Technology, IPRP, PCT/CN2018/080844, Oct. 8, 2019, 7 pgs.

* cited by examiner

| Current bill number | Order time | Order date | Virtual article identifier | First account |
|---|---|---|---|---|
| B10001 | 8 | 2017.03.17 | Q10001 | N |
| B10002 | 8 | 2017.03.17 | Q10002 | N |
| B10003 | 10 | 2017.03.17 | Q10003 | N |
| B10004 | 11 | 2017.03.17 | Q10004 | N |
| ... | ... | ... | ... | ... |

| First account | Order time | Order date | Virtual article identifier | Current bill number |
|---|---|---|---|---|
| N | 8 | 2017.03.17 | Q10001 | B10001 |
| N | 8 | 2017.03.17 | Q10002 | B10002 |
| N | 10 | 2017.03.17 | Q10003 | B10003 |
| N | 11 | 2017.03.17 | Q10004 | B10004 |
| ... | ... | ... | ... | ... |

FIG. 6d

| Original bill number | Automatic renewal | Bill time | Bill date | Virtual article identifier | First account |
|---|---|---|---|---|---|
| B1 | 1/12 | 8 | 2017.03.17 | Q10001 | N |
| B2 | 2/12 | 8 | 2017.03.17 | Q10002 | N |
| B3 | 3/12 | 10 | 2017.03.17 | Q10003 | N |
| B4 | 4/12 | 11 | 2017.03.17 | Q10004 | N |
| ... | ... | ... | ... | ... | ... |

FIG. 7b

| First account | Order time | Order date | Virtual article identifier | Automatic renewal | Original bill number |
|---|---|---|---|---|---|
| N | 8 | 2017.03.17 | Q10001 | 1/12 | B1 |
| N | 8 | 2017.03.17 | Q10002 | 2/12 | B2 |
| N | 10 | 2017.03.17 | Q10003 | 3/12 | B3 |
| N | 11 | 2017.03.17 | Q10004 | 4/12 | B4 |
| ... | ... | ... | ... | ... | ... |

FIG. 7c

INFORMATION PROCESSING METHOD AND DEVICE AND STORAGE MEDIUM

CROSS-REFERENCE TO RELATED APPLICATIONS

This application is a continuation application of PCT/CN2018/080844, entitled "INFORMATION PROCESSING METHOD AND DEVICE AND STORAGE MEDIUM" filed on Mar. 28, 2018, which claims priority to (i) Chinese Patent Application No. 201710218405.6, entitled "VIRTUAL ARTICLE RENEWAL METHOD AND APPARATUS" filed with the Patent Office of China on Apr. 5, 2017, and (ii) Chinese Patent Application No. 201710278587.6, entitled "APPLICATION PROGRAM SERVER, AND INFORMATION PROCESSING METHOD AND APPARATUS FOR SAME" filed with the Patent Office of China on Apr. 25, 2017, all of which are incorporated by reference in their entireties.

FIELD OF THE TECHNOLOGY

This application relates to the field of computer technologies, and in particular, to an information processing method, an information processing apparatus, and a storage medium.

BACKGROUND OF THE DISCLOSURE

With popularization of intelligent terminal devices, application programs provide increasing functions such as an online game and an online video. Some applications further provide a virtual value-added service or product (which is briefly referred to as a virtual article below) to be purchased by a user, such as a membership service or a virtual equipment. When purchasing a virtual article in an application program, a user may need to pay in a third-party payment system by using an account in the third-party payment system, rather than directly pay to a background server (which is briefly referred to as an application program server below) of the application program. After receiving the payment, the third-party payment system generates a payment voucher (which is referred to as a bill below), and sends the bill to a terminal device corresponding to the account in the third-party payment system. After receiving the bill, the terminal device provides the bill to an application program client, the client sends the bill and a user account that is currently used to log into the client to the application program server, and the application program server sends the corresponding virtual article to the application program client corresponding to the user account.

SUMMARY

This application provides an information processing method and apparatus, to cause a process of providing a virtual article to be more efficient and reliable.

A first aspect of the embodiments provides an information processing method, applied to an application program server, the method comprising:

receiving, by using a network, a first virtual article identifier and a first account that are sent by a terminal device, the first virtual article identifier being determined by the terminal device in response to an operation of a user on a virtual article presentation interface on the terminal device, and the first account being an account used to log into the terminal device when the operation occurs;

generating and storing a first order comprising the first virtual article identifier and the first account;

obtaining, by using the network, a current bill that is provided by a third-party payment system and that is forwarded by the terminal device, and a second account used to log into the terminal device when the current bill is received, the current bill comprising a second virtual article identifier;

determining, among a plurality of stored orders, a second order corresponding to the current bill; and sending a virtual article corresponding to the second virtual article identifier in the current bill to the second account when a virtual article identifier in the second order is the same as the second virtual article identifier and an account in the second order is the same as the second account.

A second aspect of the embodiments provides an application program server, comprising: one or more processors and memory, and a plurality of computer readable instructions stored in the memory that, when executed by the one or more processors, cause the application program server to perform the aforementioned information processing method.

A third aspect of the embodiments provides a non-transitory computer readable storage medium storing a plurality of instructions in connection with an application program server having one or more processors, wherein the plurality of instructions, when executed by the one or more processors, cause the application program server to perform the aforementioned information processing method.

BRIEF DESCRIPTION OF THE DRAWINGS

The following describes specific implementations of this application in detail with reference to the accompanying drawings, to make the technical solutions and other beneficial effects of this application obvious.

FIG. 6*d* is a schematic structural diagram of an order table according to an embodiment of this application.

FIG. 7*b* is a schematic structural diagram of another bill table according to an embodiment of this application.

FIG. 7*c* is a schematic structural diagram of another order table according to an embodiment of this application.

DESCRIPTION OF EMBODIMENTS

The following clearly and completely describes the technical solutions in the embodiments of this application with reference to the accompanying drawings in the embodiments of this application. Apparently, the described embodiments are some embodiments of this application rather than all of the embodiments. All other embodiments obtained by a person skilled in the art based on the embodiments of this application without creative efforts shall fall within the protection scope of this application.

An information processing apparatus according to the embodiments may be an independent physical device such as a server, or may be a component integrated in a server. The server may be an application server. The application server may include one or more servers.

An information processing method according to some embodiments may also be referred to as a virtual article renewal method. The method may include: obtaining a user identifier set, and virtual article information corresponding to each user identifier in the user identifier set, the virtual article information including an article identifier and a deadline of at least one virtual article; determining a target virtual article corresponding to a target user identifier in the at least one virtual article according to each deadline; then determining a target virtual bill in a stored virtual bill library according to an article identifier of the target virtual article and the target user identifier; obtaining a to-be-exchanged virtual bill of the target virtual article according to the target virtual bill; and then renewing the target virtual article according to the target user identifier and the to-be-exchanged virtual bill.

The deadline is an end time of a validity period of the virtual article for the user identifier. The target virtual bill is a payment voucher indicating that the target user identifier has purchased the target virtual article last time. The to-be-exchanged virtual bill is a payment voucher indicating that the target user identifier has purchased the target virtual article after a payment time corresponding to the target virtual bill. The renewing the target virtual article according to the target user identifier and the to-be-exchanged virtual bill means modifying the deadline that is of the target virtual article corresponding to the target user identifier that is in the virtual article information according to the to-be-exchanged virtual bill.

Figure 1:
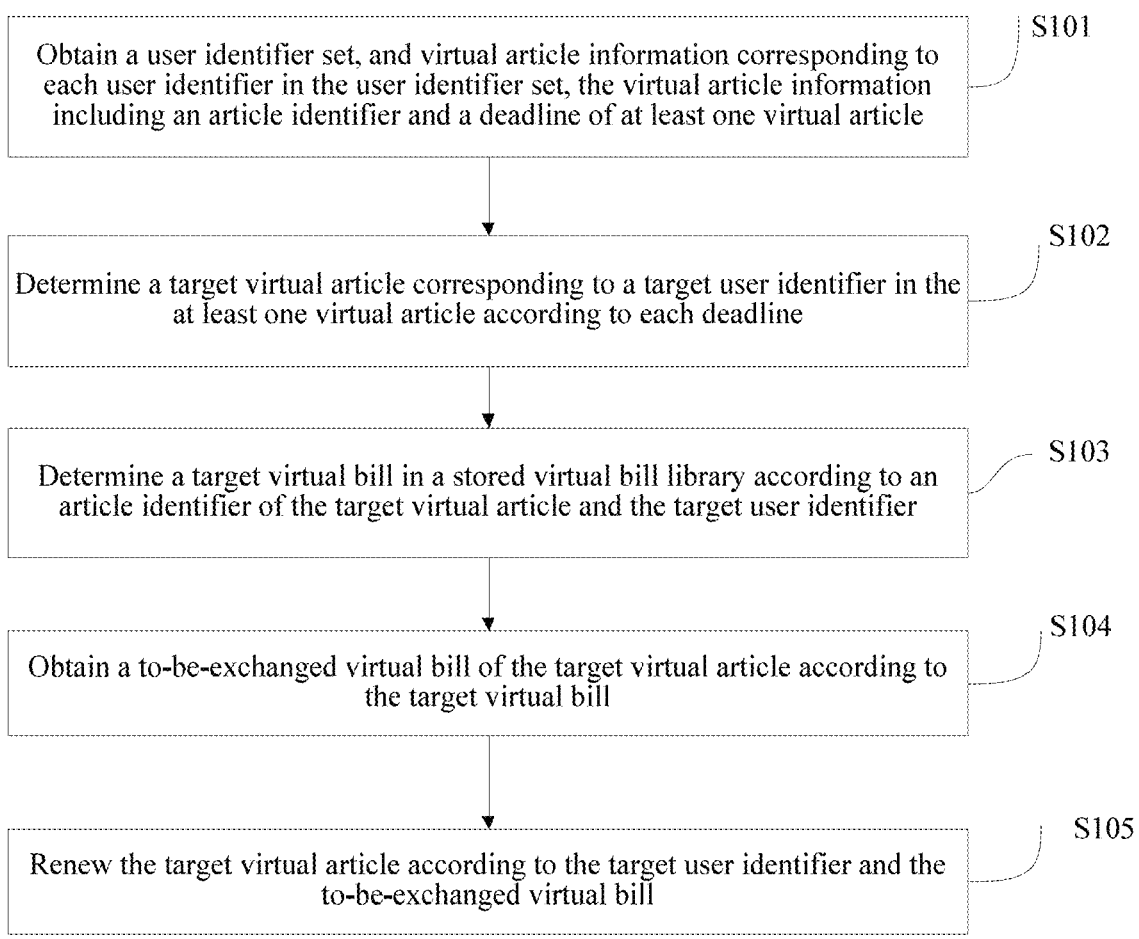
FIG. 1 is a schematic flowchart of a virtual article renewal method according to an embodiment of this application.

As shown in FIG. 1, the method may include the following steps:

S101. Obtain a user identifier set, and virtual article information corresponding to each user identifier in the user identifier set, the virtual article information including an article identifier and a deadline of at least one virtual article.

In this embodiment, the user identifier set includes at least one user identifier. The user identifier is used to distinguish different users on the same network platform (delivery platform), and may include a user account. The virtual article is an article derived from a virtual network world, and has a non-physical property. The virtual article may include a virtual product, a virtual social service and the like transacted by using real currency or virtual currency, such as a game equipment, a weapon and various membership services. Usually, each virtual article corresponds to one article identifier and one deadline. The article identifier is a unique sign used to distinguish a virtual article, and may be a common name of the virtual article, or may be a character string automatically allocated by the delivery platform to the virtual article. The deadline is mainly used to limit a validity period of a virtual article. Usually, before the deadline (including the deadline), the virtual article is in a valid state, and can be used; and beyond the deadline, that is, after the deadline, the virtual article is in an invalid state, and cannot be used.

The user identifier set and the virtual article information should be stored in advance. When a user purchases a virtual article for the first time on a network platform (purchase platform), a delivery server may calculate a deadline according to a purchase period, establish an association relationship between a user identifier of the user and an article identifier of the virtual article, and an association relationship between the article identifier of the virtual article and the deadline, and then store the association relationships into a designated database. In this way, data stored in the designated database may be obtained subsequently in real time or periodically (for example, everyday).

S102. Determine a target virtual article corresponding to a target user identifier in the at least one virtual article according to each deadline.

For example, step S102 may specifically include:
calculating a difference between each deadline and a current time;

judging whether a difference not greater than a preset threshold exists among all calculated differences; and determining, if yes, a virtual article corresponding to the difference not greater than the preset threshold as the target virtual article, and determining a user identifier corresponding to the target virtual article as the target user identifier.

In this embodiment, the preset threshold may be determined according to an actual requirement, may be a value greater than or equal to 0, and may be specifically accurate to an hour, a day or the like. When the preset threshold is set to 0, it indicates that a virtual article expiring on a current day is a target virtual article; or when the preset threshold is set to be greater than 0 or less than 0, it indicates that a virtual article within a particular time away from an expiration date or within a particular time beyond an expiration date is a target virtual article.

S103. Determine a target virtual bill in a stored virtual bill library according to an article identifier of the target virtual article and the target user identifier.

In this embodiment, the virtual bill library and the designated database that is used to store the user identifier set and the virtual article information may be located in one server, or may be located in different servers.

For example, step S103 may specifically include:

1-1. Search, according to the article identifier of the target virtual article and the target user identifier, the stored virtual bill library for a corresponding virtual bill group, where the virtual bill group includes at least one virtual bill.

In this embodiment, the virtual bill mainly means an electronic bill, may perform behaviors such as transfer, discount, pledge and collection as a physical bill does, and is a voucher that is made in a form stipulated according to law and that is shown to have a money payment obligation. Each virtual bill may include content such as a bill number, a purchased article, an amount of spent money, a purchase time and a purchase time length.

The virtual bill is usually provided by the purchase platform. When a user purchases an article on the purchase platform, the purchase platform automatically generates the virtual bill. Each virtual bill in each virtual bill group is a purchase voucher of the same user on the delivery platform for the same virtual article, and the virtual article mainly means an automatic renewal-type article such as a yellow diamond membership. Usually, after this type of virtual article purchased by the user for the first time expires, the purchase platform may perform automatic renewal by using a payment channel bound to the user, for example, perform renewal once every month. A virtual bill after each time of renewal is stored in a corresponding virtual bill group, that is, the delivery platform associates the virtual bill after each time of renewal with a user identifier and an article identifier and then stores the virtual bill in a virtual bill library of the virtual bill, so as to facilitate a subsequent search operation.

1-2. Select one virtual bill from the found virtual bill group as the target virtual bill according to a preset rule.

In this embodiment, the preset rule may be determined according to an actual requirement. For example, when virtual bills in the virtual bill group are arranged sequentially, for example, sorted according to storage times, purchase times or deadlines, a virtual bill on a designated arrangement location (for example, a location ranking first) may be directly obtained as the target virtual bill. When the virtual bills in the virtual bill group are randomly arranged, the virtual bills need to be selected according to respective storage times, purchase times or deadlines. For example, a virtual bill purchased last time is selected as the target virtual bill.

For example, when the virtual bills in the virtual bill group are randomly arranged, step 1-2 may specifically include:

obtaining a storage time of each virtual bill in the found virtual bill group;

calculating a difference between a current time and each storage time; and determining a virtual bill corresponding to a storage time as the target virtual bill, where a difference between the current time and the storage time is minimum.

In this embodiment, because all virtual bills stored in the virtual bill library are historically purchased, storage times of the virtual bills are usually before the current time. In this case, a virtual bill, where a difference between the current time and a storage time of the virtual bill is minimum, that is, a virtual bill stored last time may be determined as the target virtual bill.

S104. Obtain a to-be-exchanged virtual bill of the target virtual article according to the target virtual bill.

In this embodiment, the to-be-exchanged virtual bill usually means a virtual bill whose purchase time is after that of the target virtual bill, and the to-be-exchanged virtual bill may be specifically obtained by using a designated website interface such as an interface provided on an official website.

For example, step S104 may specifically include:

generating a renewal bill query request according to the target virtual bill;

sending the renewal bill query request to a preset server, to cause the preset server to return the to-be-exchanged virtual bill of the target virtual article according to the target virtual bill; and receiving the to-be-exchanged virtual bill returned by the preset server.

In this embodiment, the preset server may be determined according to an actual requirement, and may be a server of the purchase platform. The preset server may provide a bill query function, that is, provide a designated interface. When the user enters the target virtual bill to the designated interface, the preset server may find, according to record content on the target virtual bill such as a bill number and an article identifier, an account of the purchase user, and all virtual bills of the purchase user for purchasing the target virtual article, determine a virtual bill whose purchase time is after that of the target virtual bill as the to-be-exchanged virtual bill, and return the to-be-exchanged virtual bill to the user.

Because the virtual bill is provided by the purchase platform, the account of the purchase user is a registration account on the purchase platform. When the purchase platform and the delivery platform are not the same network platform, because different network platforms have different account systems, the account of the purchase user is usually different from the user identifier. Additionally, the preset server cannot always return a to-be-exchanged virtual bill each time receiving a renewal bill query request. If the purchase platform cannot successfully perform fee deduction from the payment channel bound to the user, such as, if balance of the payment channel is insufficient, renewal fails. In this case, the purchase platform does not generate a to-be-exchanged virtual bill, and a returned result of the preset server may be empty. When the returned result is empty, the delivery platform does not need to perform a renewal operation either.

S105. Renew the target virtual article according to the target user identifier and the to-be-exchanged virtual bill.

In this embodiment, because the target virtual article is usually an automatic renewal-type article, the renewal operation mainly means prolonging a deadline of the target virtual article, that is, step S105 may specifically include:

extracting renewal time length information from the to-be-exchanged virtual bill;

obtaining the deadline of the target virtual article corresponding to the target user identifier as a target deadline; and updating the target deadline by using the renewal time length information, so as to renew the target virtual article.

In this embodiment, the renewal time length information is a purchase time length recorded in the to-be-exchanged virtual bill, and the target deadline may be specifically updated by adding the purchase time length to the target deadline, thereby completing a renewal operation on the target virtual article on the delivery platform, to implement asynchronous renewal of the purchase platform and the delivery platform. Moreover, after the renewal operation of the delivery platform is completed, the to-be-exchanged virtual bill has been exchanged in this case, and the to-be-exchanged virtual bill needs to be further stored into the virtual bill library, so as to ensure that a next asynchronous renewal operation is to be normally performed. To be specific, after step S105, the virtual article renewal method may further include:

storing the to-be-exchanged virtual bill into the found virtual bill group, so as to update the virtual bill library.

In this embodiment, after each time a new to-be-exchanged virtual bill is exchanged, the to-be-exchanged virtual bill is stored in the virtual bill library, and therefore the virtual bill library stores all exchanged virtual bills on the delivery platform. Then, the user may periodically obtain a latest to-be-exchanged virtual bill from the purchase platform by using these exchanged virtual bills, to implement an asynchronous renewal operation on the automatic renewal-type article in time, effectively ensure service continuity, and avoid interruption.

It can be known from the foregoing that, in the virtual article renewal method provided in this embodiment, a user identifier set, and virtual article information corresponding to each user identifier in the user identifier set are obtained, the virtual article information including an article identifier and a deadline of at least one virtual article; a target virtual article corresponding to a target user identifier is determined in the at least one virtual article according to each deadline; then a target virtual bill is determined in a stored virtual bill library according to an article identifier of the target virtual article and the target user identifier; a to-be-exchanged virtual bill of the target virtual article is obtained according to the target virtual bill; and then the target virtual article is renewed according to the target user identifier and the to-be-exchanged virtual bill, to ensure that after performing successful renewal on a purchase platform side, a user renews a subscription service on a delivery platform side in time, thereby relatively well implementing a cross-platform asynchronous renewal operation, and avoiding interruption of the subscription service, and the method is simple.

In some embodiments, an information processing apparatus may be integrated in a delivery server in an application server. Description is made below by using an example in which a preset server is a purchase server.

Figure 2A:
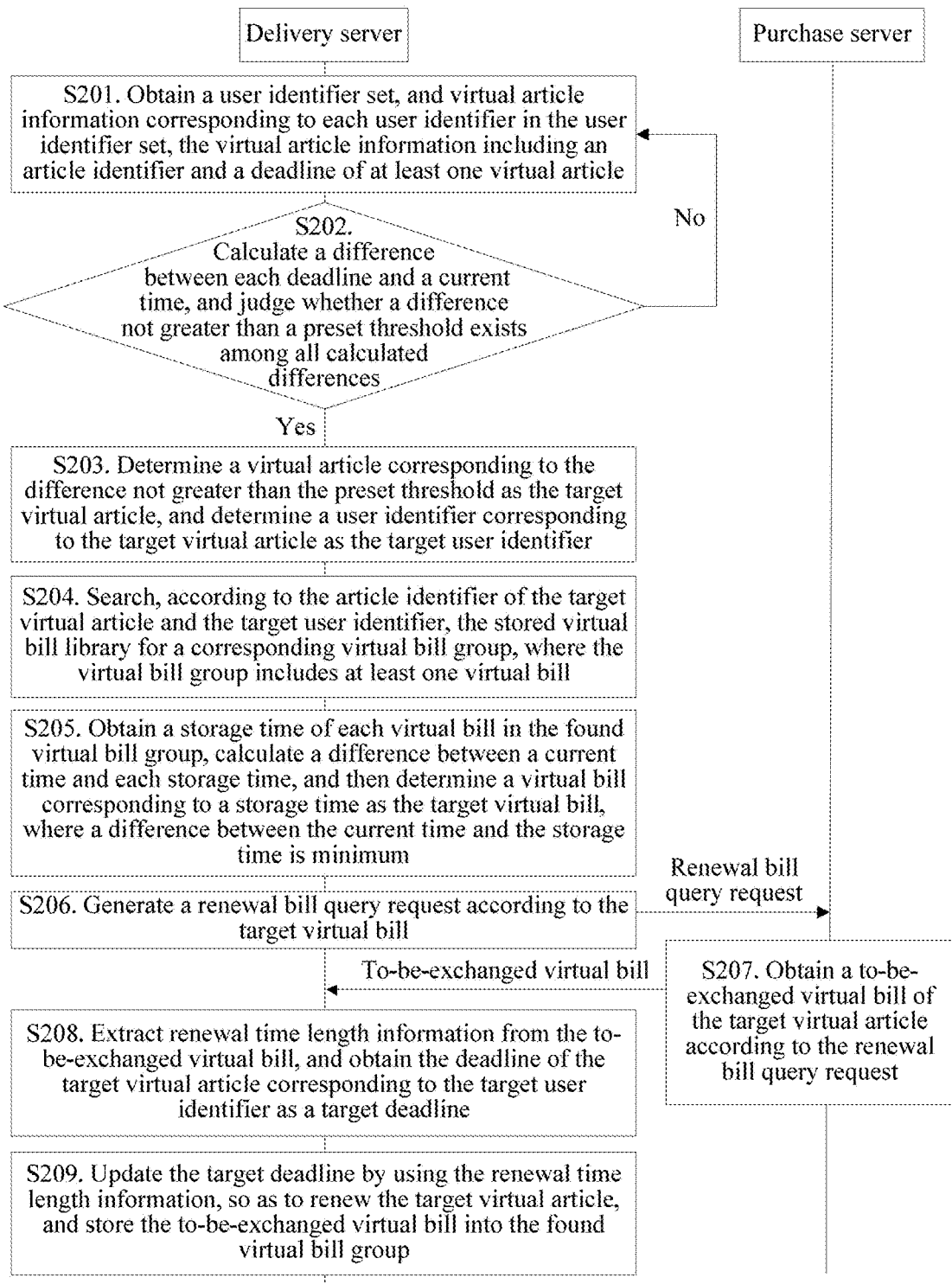
FIG. 2a is a schematic flowchart of a virtual article renewal method according to an embodiment of this application.

As shown in FIG. 2a, a virtual article renewal method may include the following steps:

S201. A delivery server obtains a user identifier set, and virtual article information corresponding to each user identifier in the user identifier set, the virtual article information including an article identifier and a deadline of at least one virtual article.

Figure 2B:
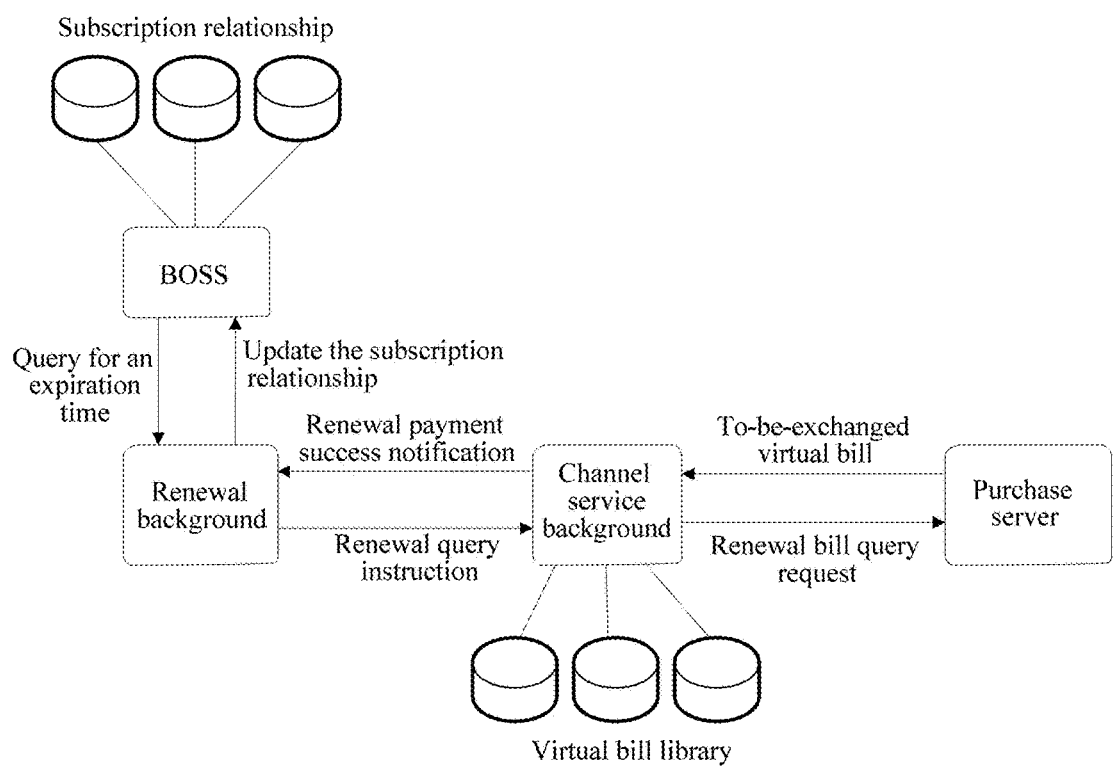
FIG. 2b is a schematic framework diagram of a virtual article renewal process according to an embodiment of this application.

For example, the user identifier may be a user account through which a user registers on a delivery platform, and the virtual article may be various automatic renewal-type subscription services provided by the delivery platform, such as a yellow diamond membership and a red diamond membership. The article identifier may be a name of the subscription service. The user identifier set and the virtual article information may be stored and managed by using a Business & Operation Support System (BOSS), that is, a subscription relationship between each user and a subscription service of the user is stored in the BOSS. For details, refer to FIG. 2b. A renewal background of the delivery server may obtain, periodically or in real time, data stored in the BOSS, and a specific obtaining frequency may be determined according to an actual requirement.

S202. The delivery server calculates a difference between each deadline and a current time, and judges whether a difference not greater than a preset threshold exists among all calculated differences. If yes, step S203 is performed; or if not, step S201 may be performed again.

For example, the preset threshold may be A1, and the difference may include {B1, B2, B3, . . . , Bn}, where n is a positive integer greater than 1. If there is Bi less than or equal to A1, it is judged that a difference not greater than the preset threshold exists among all of the calculated differences; otherwise, it is judged that a difference not greater than the preset threshold does not exist among all of the calculated differences, where i□(1, 2, . . . , n).

S203. The delivery server determines a virtual article corresponding to the difference not greater than the preset threshold as the target virtual article, and determines a user identifier corresponding to the target virtual article as the target user identifier.

For example, if a difference between a deadline of an automatic renewal-type subscription service Wi (that is, article identifier) and the current time is Bi, and a user corresponding to Wi is Ui (that is, user identifier), the renewal background may determine Wi as the target virtual article, and determine Ui as the target user identifier.

S204. The delivery server searches, according to the article identifier of the target virtual article and the target user identifier, the stored virtual bill library for a corresponding virtual bill group, where the virtual bill group includes at least one virtual bill.

For example, the virtual bill library is used to store a purchase voucher of a subscription service purchased by each registration user on the delivery platform, and each virtual bill group is a purchase voucher of the same user for the same subscription service. The virtual bill library may be managed and controlled by using a channel service background, referring to FIG. 2b. Specifically, the renewal background may send a renewal query instruction carrying Ui and Wi to the channel service background, so that the channel service background finds a virtual bill group Pi from the virtual bill library according to Ui and Wi, and virtual bills in the virtual bill group Pi may be randomly arranged.

S205. The delivery server obtains a storage time of each virtual bill in the found virtual bill group, calculates a difference between a current time and each storage time, and then determines a virtual bill corresponding to a storage time as the target virtual bill, where a difference between the current time and the storage time is minimum.

For example, the channel service background may obtain a storage time of each virtual bill in the virtual bill group Pi, and use a virtual bill stored last time as the target virtual bill.

S206. The delivery server generates a renewal bill query request according to the target virtual bill, and then sends the renewal bill query request to a purchase server.

For example, the channel service background may send the target virtual bill to the purchase server by using a designated channel (interface) provided by the purchase server.

S207 the purchase server obtains a to-be-exchanged virtual bill of the target virtual article according to the renewal bill query request, and sends the to-be-exchanged virtual bill to the delivery server.

For example, the purchase server may analyze the target virtual bill, extract information such as a bill number and an article identifier Wi from the target virtual bill, and query a local database for a latest renewal record of Wi according to these pieces of information, to determine whether a virtual bill whose purchase date is after that of the target virtual bill (that is, a virtual bill that is not exchanged) exists. If yes, the virtual bill that is not exchanged is sent to the delivery server, so as to be exchanged by the delivery server, thereby completing a renewal process of Wi on the delivery platform.

S208. The delivery server extracts renewal time length information from the to-be-exchanged virtual bill, and obtains the deadline of the target virtual article corresponding to the target user identifier as a target deadline.

For example, when receiving the to-be-exchanged virtual bill, the channel service background may send a renewal payment success notification carrying the to-be-exchanged virtual bill to the renewal background, so that the renewal background completes a remaining renewal process. Specifically, the renewal background may extract a purchase time length (that is, renewal time length) t from the to-be-exchanged virtual bill, and obtain a current deadline T of Wi purchased by a user Ui on the delivery platform.

S209. The delivery server updates the target deadline by using the renewal time length information, so as to renew the target virtual article, and stores the to-be-exchanged virtual bill into the found virtual bill group.

For example, the renewal background may update a subscription relationship of the user Ui, and an updated target deadline T' may be T+t. Meanwhile, the channel service background may update the virtual bill group Pi in the virtual bill library, so that Pi includes the to-be-exchanged virtual bill.

In the virtual article renewal method provided in the embodiments, a delivery server may obtain a user identifier set, and virtual article information corresponding to each user identifier in the user identifier set, the virtual article information including an article identifier and a deadline of at least one virtual article; calculates a difference between each deadline and a current time, and judges whether a difference not greater than a preset threshold exists among all calculated differences; determines, if yes, a virtual article corresponding to the difference not greater than the preset threshold as the target virtual article, and determines a user identifier corresponding to the target virtual article as the target user identifier; searches, according to the article identifier of the target virtual article and the target user identifier, the stored virtual bill library for a corresponding virtual bill group, where the virtual bill group includes at least one virtual bill; obtains a storage time of each virtual bill in the found virtual bill group, calculates a difference between a current time and each storage time, and then determines a virtual bill corresponding to a storage time as the target virtual bill, where a difference between the current time and the storage time is minimum; and generates a renewal bill query request according to the target virtual bill, and sends the renewal bill query request to a purchase server. The purchase server obtains a to-be-exchanged virtual bill of the target virtual article according to the renewal bill query request, and sends the to-be-exchanged virtual bill to the delivery server. The delivery server extracts renewal time length information from the to-be-exchanged virtual bill, and obtains the deadline of the target virtual article corresponding to the target user identifier as a target deadline; and updates the target deadline by using the renewal time length information, so as to renew the target virtual article, and stores the to-be-exchanged virtual bill into the found virtual bill group. Therefore, it can be ensured that after performing successful renewal on a purchase platform side, a user renews a subscription service on a delivery platform side in time, thereby relatively well implementing a cross-platform asynchronous renewal operation, and avoiding interruption of the subscription service, and the method is simple.

Figure 3A:
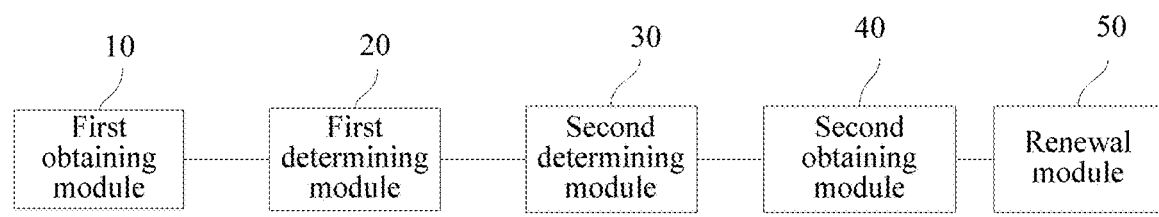
FIG. 3a is a schematic structural diagram of a virtual article renewal apparatus according to an embodiment of this application.

FIG. 3a shows an information processing apparatus provided in an embodiment of this application. The information processing apparatus may include: a first obtaining module 10, a first determining module 20, a second determining module 30, a second obtaining module 40, and a renewal module 50.

(1) First Obtaining Module 10

The first obtaining module 10 is configured to obtain a user identifier set, and virtual article information corresponding to each user identifier in the user identifier set, the virtual article information including an article identifier and a deadline of at least one virtual article.

The user identifier set and the virtual article information should be stored in advance. When a user purchases a virtual article for the first time on a network platform (purchase platform), a delivery server may calculate a deadline according to a purchase period, establish an association relationship between a user identifier of the user and an article identifier of the virtual article, and an association relationship between the article identifier of the virtual article and the deadline, and then store the association relationships into a designated database. In this way, the first obtaining module 10 may obtain, subsequently in real time or periodically (for example, everyday), data stored in the designated database.

(2) First Determining Module 20

The first determining module 20 is configured to determine a target virtual article corresponding to a target user identifier in the at least one virtual article according to each deadline.

For example, the first determining module 20 may be specifically configured to:

calculate a difference between each deadline and a current time;

judge whether a difference not greater than a preset threshold exists among all calculated differences; and determine, if yes, a virtual article corresponding to the difference not greater than the preset threshold as the target virtual article, and determine a user identifier corresponding to the target virtual article as the target user identifier.

(3) Second Determining Module 30

The second determining module 30 is configured to determine a target virtual bill in a stored virtual bill library according to an article identifier of the target virtual article and the target user identifier.

In this embodiment, the virtual bill library and the designated database that is used to store the user identifier set and the virtual article information may be located in one server, or may be located in different servers.

Figure 3B:
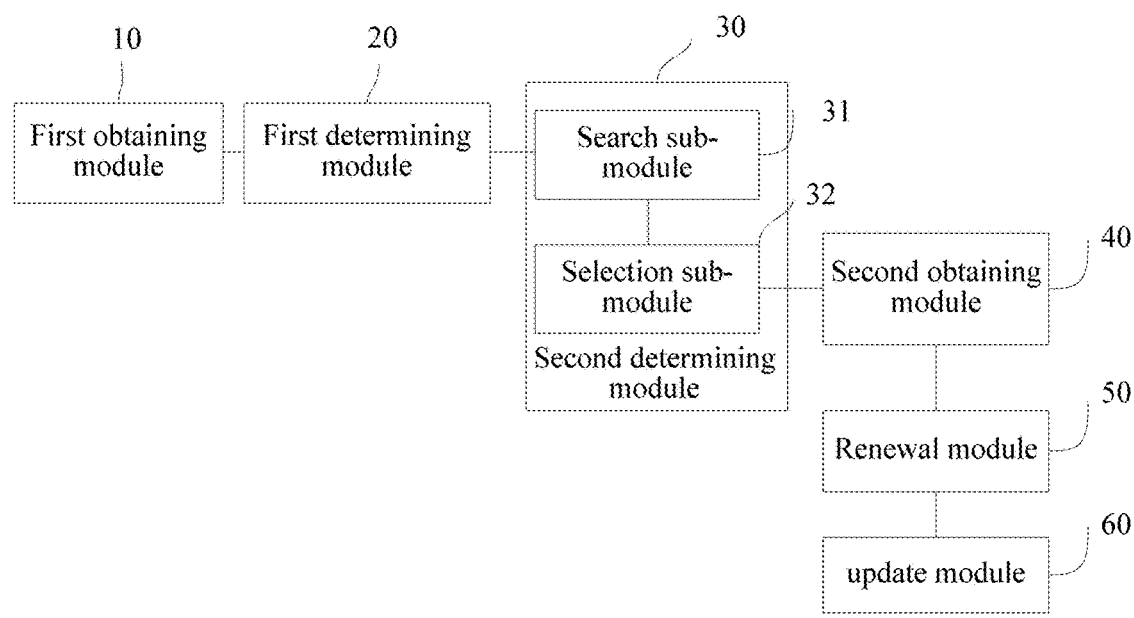
FIG. 3b is a schematic structural diagram of another virtual article renewal apparatus according to an embodiment of this application.

For example, referring to FIG. 3b, the second determining module 30 may specifically include a search sub-module 31 and a selection sub-module 32.

The search sub-module 31 is configured to search, according to the article identifier of the target virtual article and the target user identifier, the stored virtual bill library for a corresponding virtual bill group, where the virtual bill group includes at least one virtual bill.

The selection sub-module 32 is configured to select one virtual bill from the found virtual bill group as the target virtual bill according to a preset rule.

In this embodiment, the preset rule may be determined according to an actual requirement. For example, when virtual bills in the virtual bill group are arranged sequentially, for example, sorted according to storage times, purchase times or deadlines, the selection sub-module 32 may directly obtain a virtual bill on a designated arrangement location (for example, a location ranking first) as the target virtual bill. When the virtual bills in the virtual bill group are randomly arranged, the selection sub-module 32 needs to select the virtual bills according to respective storage times, purchase times or deadlines, for example, select a virtual bill purchased last time as the target virtual bill.

For example, when the virtual bills in the virtual bill group are randomly arranged, the selection sub-module 32 may be specifically configured to:

obtain a storage time of each virtual bill in the found virtual bill group;

calculate a difference between a current time and each storage time; and determine a virtual bill corresponding to a storage time as the target virtual bill, where a difference between the current time and the storage time is minimum.

In this embodiment, because all virtual bills stored in the virtual bill library are historically purchased, storage times of the virtual bills are usually before the current time. In this case, the selection sub-module 32 may determine a virtual bill, where a difference between the current time and a storage time of the virtual bill is minimum, that is, a virtual bill stored last time as the target virtual bill.

(4) Second Obtaining Module 40

The second obtaining module 40 is configured to obtain a to-be-exchanged virtual bill of the target virtual article according to the target virtual bill.

In this embodiment, the to-be-exchanged virtual bill usually means a virtual bill whose purchase time is after that of the target virtual bill, and the second obtaining module 40 may specifically obtain the to-be-exchanged virtual bill by using a designated website interface such as an interface provided on an official website.

For example, the second obtaining module 40 may be specifically configured to:

generate a renewal bill query request according to the target virtual bill;

send the renewal bill query request to a preset server, to cause the preset server to return the to-be-exchanged virtual bill of the target virtual article according to the target virtual bill; and receive the to-be-exchanged virtual bill returned by the preset server.

(5) Renewal Module 50

The renewal module 50 is configured to renew the target virtual article according to the target user identifier and the to-be-exchanged virtual bill.

In this embodiment, because the target virtual article is usually an automatic renewal-type article, the renewal operation mainly means prolonging a deadline of the target virtual article, that is, the renewal module 50 may be specifically configured to:

extract renewal time length information from the to-be-exchanged virtual bill;

obtain the deadline of the target virtual article corresponding to the target user identifier as a target deadline; and update the target deadline by using the renewal time length information, so as to renew the target virtual article.

In this embodiment, the renewal time length information is a purchase time length recorded in the to-be-exchanged virtual bill, and the renewal module 50 may specifically update the target deadline by adding the purchase time length to the target deadline, thereby completing a renewal operation on the target virtual article on the delivery platform, to implement asynchronous renewal of the purchase platform and the delivery platform. After the renewal operation of the delivery platform is completed, the to-be-exchanged virtual bill has been exchanged, and the delivery server needs to further store the to-be-exchanged virtual bill into the virtual bill library, so as to ensure that a next asynchronous renewal operation is to be normally performed. The renewal apparatus may further include an update module 60, configured to:

store, after the renewal module 50 renews the target virtual article according to the target user identifier and the to-be-exchanged virtual bill, the to-be-exchanged virtual bill into the virtual bill group found by the search sub-module 31, so as to update the virtual bill library.

In this embodiment, after each time a new to-be-exchanged virtual bill is exchanged, the to-be-exchanged virtual bill is stored in the virtual bill library, and therefore the virtual bill library stores all exchanged virtual bills on the delivery platform. Then, the user may periodically obtain a latest to-be-exchanged virtual bill from the purchase platform by using these exchanged virtual bills, to implement an asynchronous renewal operation on the automatic renewal-type article in time, effectively ensure service continuity, and avoid interruption.

In a specific implementation, the foregoing units may be implemented as independent entities, or may be combined arbitrarily, or may be implemented as the same entity or several entities. For specific implementations of the foregoing units, refer to the foregoing method embodiments. Details are not described herein again.

It can be known from the foregoing that, the apparatus according to this embodiment can ensure that after performing successful renewal on a purchase platform side, a user renews a subscription service on a delivery platform side in time, thereby relatively well implementing a cross-platform asynchronous renewal operation, and avoiding interruption of the subscription service, and the method is simple.

An embodiment of this application further provides an information processing system, including any apparatus provided in the embodiments of this application.

A delivery server may obtain a user identifier set, and virtual article information corresponding to each user identifier in the user identifier set, the virtual article information including an article identifier and a deadline of at least one virtual article; determine a target virtual article corresponding to a target user identifier in the at least one virtual article according to each deadline; determine a target virtual bill in a stored virtual bill library according to an article identifier of the target virtual article and the target user identifier; obtain a to-be-exchanged virtual bill of the target virtual article according to the target virtual bill; and renew the target virtual article according to the target user identifier and the to-be-exchanged virtual bill.

Moreover, the system may further include a purchase server. The purchase server may obtain a to-be-exchanged virtual bill, and send the to-be-exchanged virtual bill to the delivery server.

Figure 4:
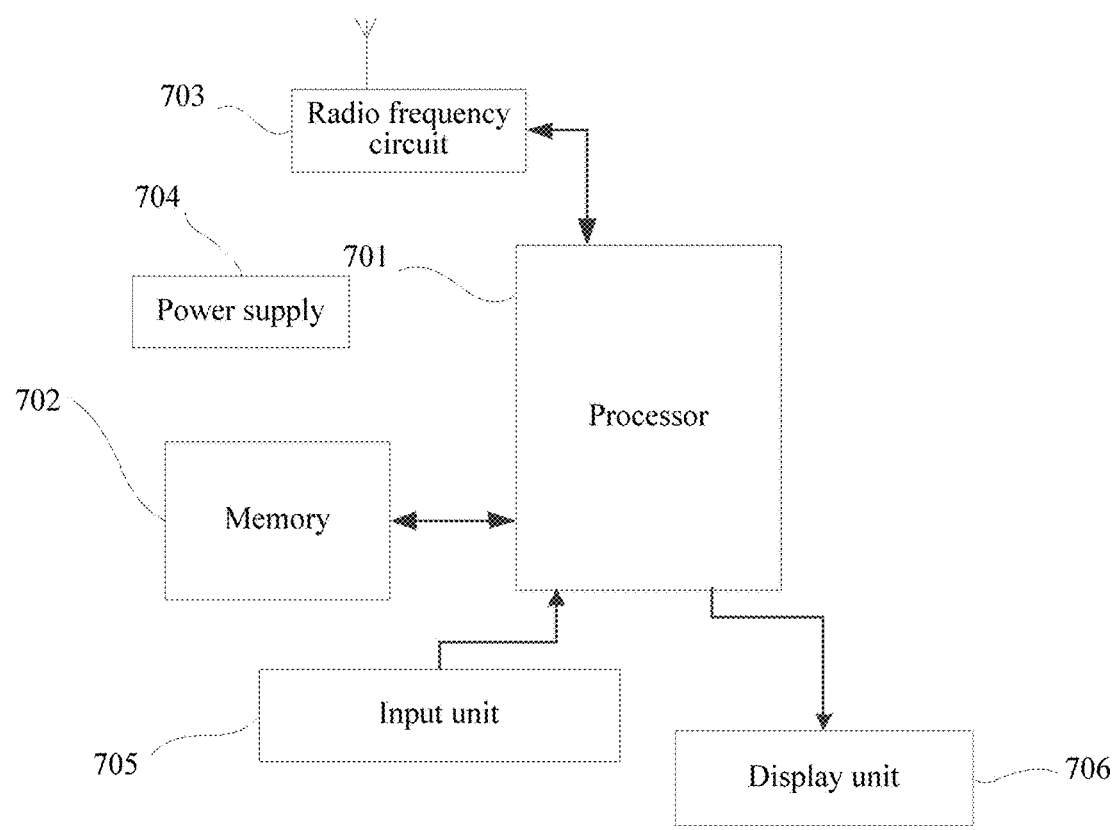
FIG. 4 is a schematic structural diagram of a server according to an embodiment of this application.

An embodiment of this application further provides a server. FIG. 4 is a schematic structural diagram of a server according to an embodiment of this application. The server may include components such as a processor 701 including one or more processing cores, a memory 702 including one or more computer readable storage media, a radio frequency (RF) circuit 703, a power supply 704, an input unit 705, and a display unit 707. A person skilled in the art may understand that the server structure shown in FIG. 4 does not constitute a limit to the server. The server may include more or fewer parts than those shown in the figure, may combine some parts, or may have different part arrangements.

The processor 701 is a control center of the server, and is connected to various parts of the entire server by using various interfaces and lines. By running or executing a software program and/or module stored in the memory 702, and invoking data stored in the memory 702, the processor 701 executes various functions of the server and performs data processing, thereby monitoring the entire server. In some examples, the processor 701 may include one or more processing cores.

The memory 702 may be configured to store a software program and module. The processor 701 runs the software program and module stored in the memory 702, so as to execute various function applications and data processing. The memory 702 may mainly include a program storage area and a data storage area. The program storage area may store an operating system, an application program required by at least one function (such as a sound playing function and an image display function), and the like. The data storage area may store data created according to use of the server, and the like. In addition, the memory 702 may include a high speed random access memory, and may also include a non-volatile memory such as at least one magnetic disk storage device, a flash memory, or another volatile solid-state storage device. The memory 702 may further include a memory controller, to provide access of the processor 701 to the memory 702.

The processor 701 in the server may load, according to the following instructions, executable files corresponding to processes of one or more application programs into the memory 702. The processor 701 runs the application programs stored in the memory 702, to implement various functions, for example:

obtain a user identifier set, and virtual article information corresponding to each user identifier in the user identifier set, the virtual article information including an article identifier and a deadline of at least one virtual article;

determine a target virtual article corresponding to a target user identifier in the at least one virtual article according to each deadline;

determine a target virtual bill in a stored virtual bill library according to an article identifier of the target virtual article and the target user identifier;

obtain a to-be-exchanged virtual bill of the target virtual article according to the target virtual bill; and renew the target virtual article according to the target user identifier and the to-be-exchanged virtual bill.

Figure 5A:
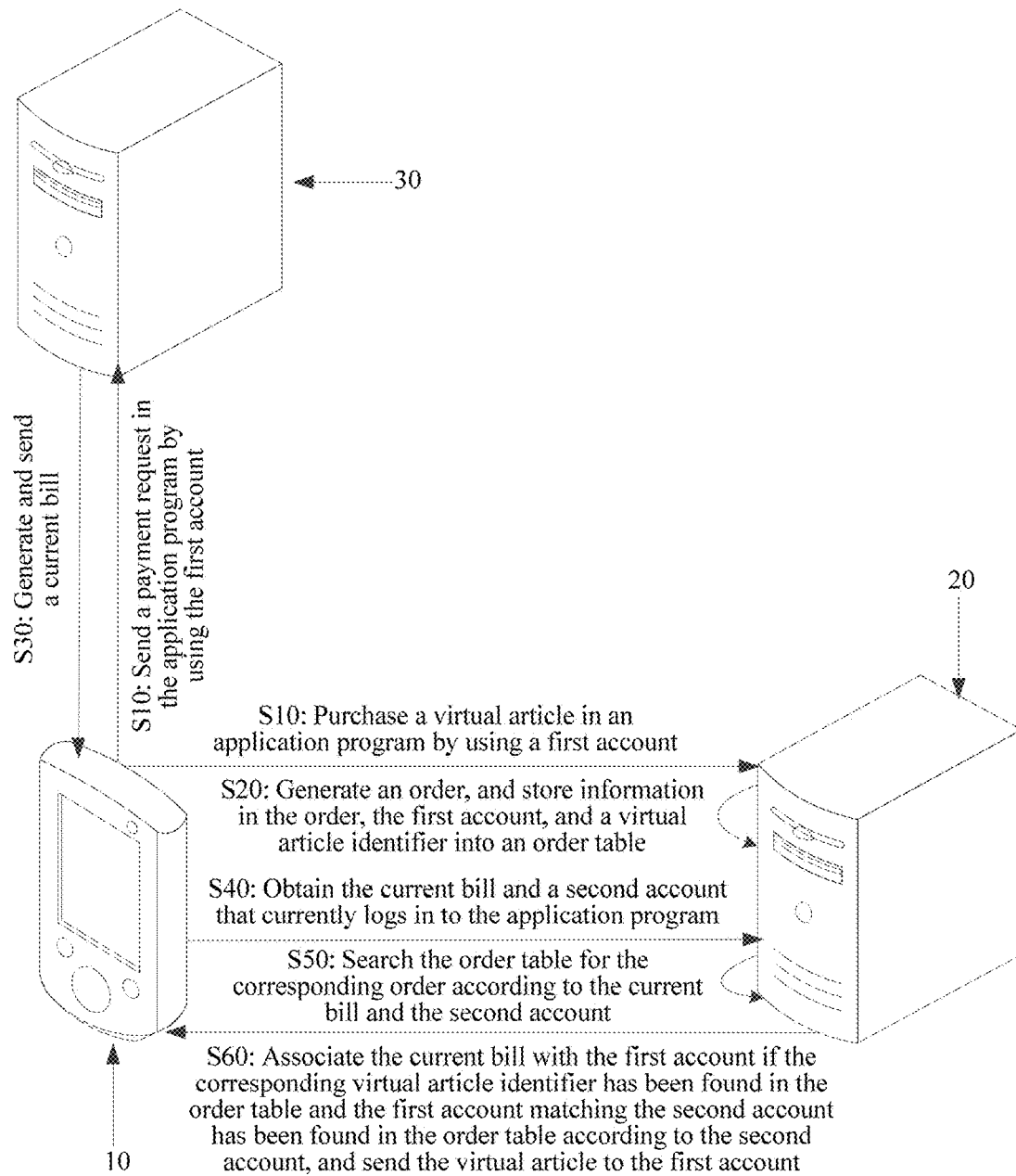
FIG. 5a is a schematic diagram of a scenario of an information processing method for an application program server according to an embodiment of this application.

FIG. 5a is a schematic diagram of a scenario of an information processing method for an application program server according to an embodiment of this application. The scenario may include an application program server 520, an application program terminal 510, and a payment server 530. In this application, the application program server 520 interacts with the application program terminal 510, and the application program terminal 510 interacts with the payment server 530, to complete overall information processing.

In the embodiments, the application program terminal 510 is a terminal device on which an application program communicating with the application program server 520 is run. For example, the application program terminal is a mobile phone client or a personal computer (PC). For example, the application program run on the application program terminal 510 is QQ or WeChat.

A user logs in to the application program of the application program terminal 510 by using a first account, and sends an ordering request to the application program server 520 in the application program by using the first account, and the application program sends ordering information to the application program server 520 (S10). To be specific, the user sends, by using the application program in the application program terminal 510, a request for purchasing a virtual article to the application program server 520. While the application program of the application program terminal 510 sends the ordering information to the application program server 520, the application program sends a payment request to the payment server 530 by using the first account and by using the application program terminal 510, or sends a payment request to the payment server 530 by using an application program terminal account and by using the application program terminal 510.

In the embodiments, the first account is an initial login account of the application program in the application program terminal 510. For example, the application program is a WeChat APP, and the first account is an account of logging in to the WeChat APP. For example, a WeChat APP account is N.

In the embodiments, the application program terminal account is, for example, an Apple ID.

In the embodiments, a related virtual article may be a game equipment, a game material, a game pet, game currency, an icon, a membership, a title, a value-added service, a credit, a shoe-shaped gold ingot, a golden bean, a gift voucher, an exchange certificate, a discount coupon, a greeting card, or the like.

Figure 5B:
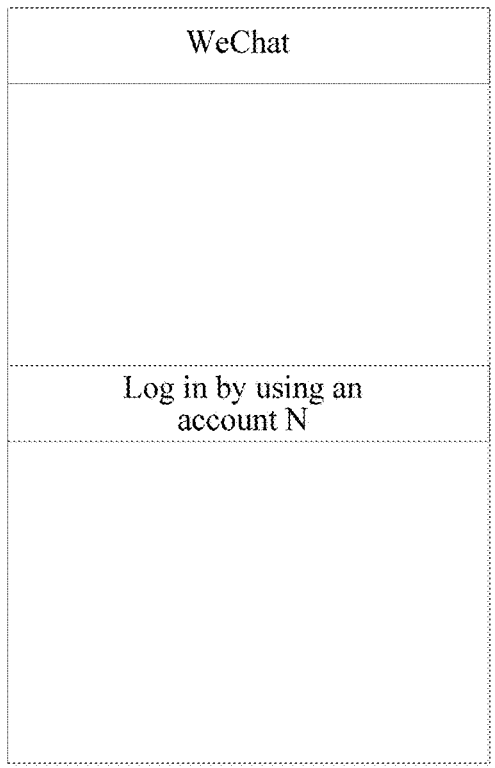
FIG. 5b is a schematic diagram of logging in, by a user, to a WeChat APP of an application program terminal by using an account N according to an embodiment of this application.
Figure 5C:
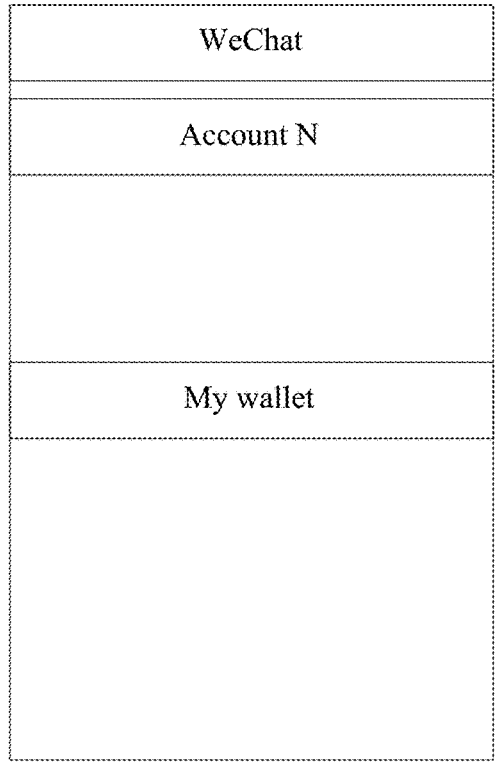
FIG. 5c is a schematic diagram of an interface of a wallet in a WeChat APP according to an embodiment of this application.
Figure 5D:
FIG. 5d is a schematic diagram of an interface of a game micro-store in a WeChat APP according to an embodiment of this application.
Figure 5E:
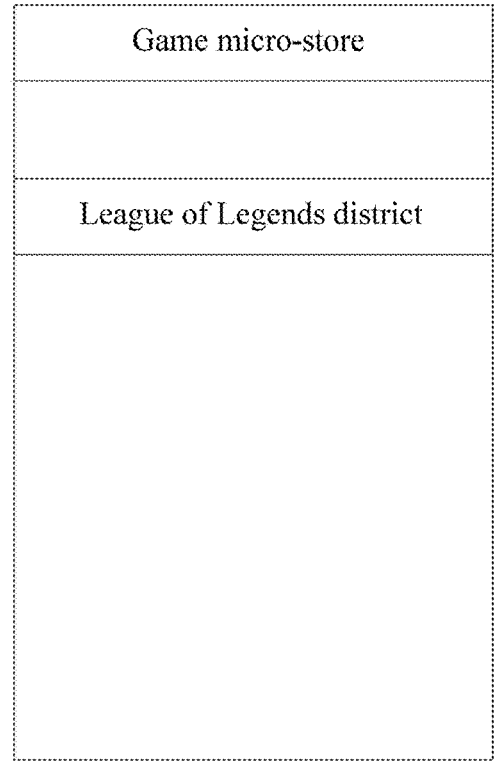
FIG. 5e is a schematic diagram of an interface of a League of Legends district in a WeChat APP according to an embodiment of this application.
Figure 5F:
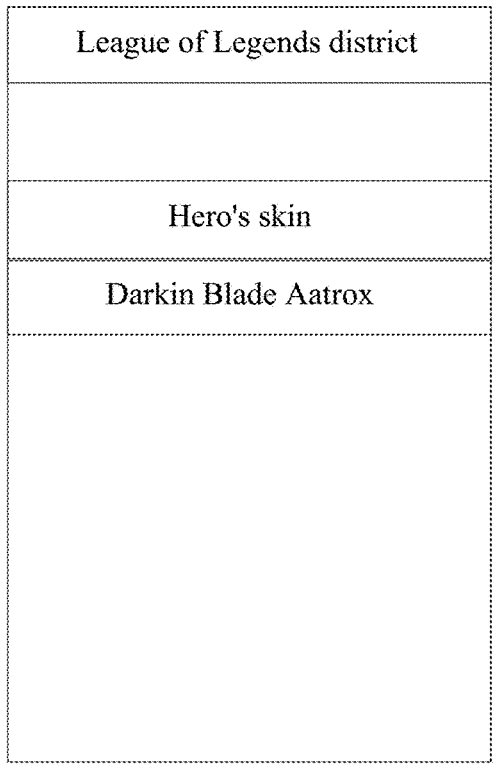
FIG. 5*f* is a schematic diagram of an interface of skins of a League of Legends district in a WeChat APP according to an embodiment of this application.
Figure 5G:
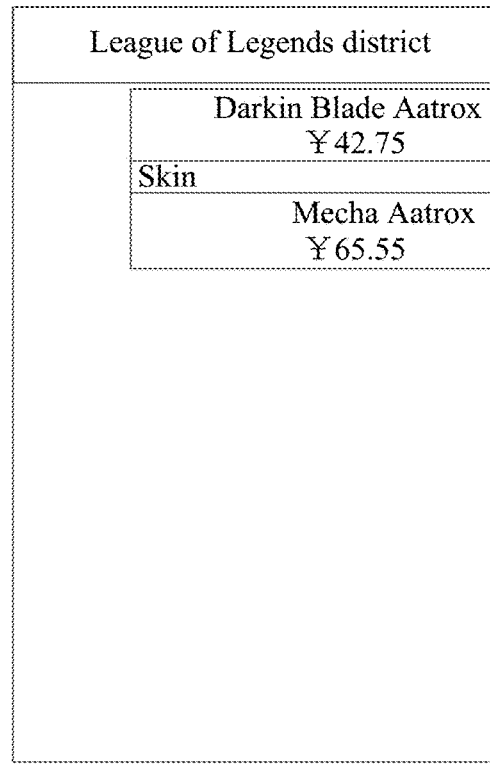
FIG. 5*g* is a schematic diagram of an interface of skins of Darkin Blade Aatrox of a League of Legends district in a WeChat APP according to an embodiment of this application.
Figure 5H:
FIG. 5*h* is a schematic diagram of an interface of order confirmation in a WeChat APP according to an embodiment of this application.

For example, FIG. 5b to FIG. 5h are schematic diagrams of some interfaces through which a user logs in to a WeChat APP and purchases a virtual article on the WeChat APP. Referring to FIG. 5b, the user logs in to the WeChat APP of the application program terminal 10 by using an account N. After the user logs in to the WeChat APP, referring to FIG. 5c, the user selects "my wallet", to enter "my wallet". After the user enters "my wallet", referring to FIG. 5d, the user selects "game micro-store" in "my wallet" of the WeChat APP, to enter "game micro-store". After the user enters "game micro-store", referring to FIG. 5e, the user selects "League of Legends district" in "game micro-store", to enter "League of Legends district". After the user enters "League of Legends district", referring to FIG. 5f, the user selects "Darkin Blade Aatrox" of "hero skin" in "League of Legends district", to enter a skin page of "Darkin Blade Aatrox". After the user enters the skin page of "Darkin Blade Aatrox", referring to FIG. 5g, the user selects a skin of "Mecha Aatrox" on the skin page. After the user selects the skin of "Mecha Aatrox" on the skin page, referring to FIG. 5h, the user confirms an order, and selects a game region such as an Ionia region of China Telecom, to complete purchase through "WeChat payment" after the selection, that is, complete ordering.

After receiving the ordering request, the application program server 520 generates an order, and stores information in the order, the first account, and a virtual article identifier on a location, in an order table, of the first account and the virtual article identifier corresponding to the information in the same order (S20). For example, the information in the order, the first account, and the virtual article identifier are located on the same row or the same column in the order table. To be specific, the original information in the order such as an order time and an order date, together with the first account and the virtual article identifier forms a new order item.

The order table may include one, two, or more orders. Order information in an order includes information such as an order time, an order date, the first account, and an identifier corresponding to a virtual article. The identifier corresponding to the virtual article is defined herein as a virtual article identifier such as a number of the virtual article. Specifically, for example, a virtual article is 100 Q coins, and a virtual article identifier corresponding to the 100 Q coins is Q10001. For another example, a virtual article is an annual Tencent video membership, and a virtual article identifier corresponding to the annual Tencent video membership is SP10001.

After receiving the payment request, the payment server 530 performs fee deduction according to the payment request, and generates a current bill; and sends the current bill to a second account of the application program of the application program terminal 510 (S30).

After receiving the payment request, the payment server 530 performs fee deduction according to the payment request, and generates a bill, where this bill is defined as the current bill. The payment server 530 sends the generated current bill to the application program terminal 510. Therefore, regardless of whether login to the application program in the application program terminal 510 is still performed by using the first account, the payment server 530 still sends the generated current bill to the application program terminal 510. Therefore, a login account for performing login when the application program terminal 510 receives the current bill sent by the payment server 530 is defined as the second account.

In the embodiments, the second account is a current login account of the application program of the application program terminal 510. For example, the second account is a login account for currently logging in to the application program. For example, the second account is M. For example, the application program is the WeChat APP, the current login account is M, and the current login account M is the second account. Therefore, the second account may be the same as or different from the first account.

It should be noted that, in the embodiments of this application, bill information of the current bill includes information such as a number of the current bill and a virtual article identifier.

After the second account of the application program in the application program terminal 510 receives the current bill, the application program in the application program terminal 510 sends the current bill and the second account to the application program server 520, and the application program server 520 receives the current bill and the second account from the application program terminal 510 (S40).

After receiving the current bill and the second account from the application program terminal 510, the application program server 520 searches the order table for a corresponding order according to the current bill and the second account (S50).

The application program server 520 may receive the current bill and the second account, and search, according to the second account and the virtual article identifier in the current bill, the order table for an order corresponding to the second account and the virtual article identifier. For example, the application program server 520 may search, according to the second account, the order table for the first account matching the second account, and the application program server 520 searches, according to the virtual article identifier, the order table for a virtual article identifier the same as the virtual article identifier.

That search for the first account matching the second account is performed according to the second account means that search for the first account the same as the second account is performed according to the second account.

If the application program server 520 has found the virtual article identifier in the order table, and has found, according to the second account, the first account matching the second account in the order table, the application program server 520 associates the current bill with the first account, and the application program server 520 sends, according to the current bill and the first account that are associated, a corresponding virtual article to the first account of the application program in the application program terminal 510 (S60).

Therefore, if the user always uses the same account, that is, the first account, the application program server 520 always sends, in a process of sending the virtual article, the virtual article to the first account associated with the current bill, rather than send the virtual article to another account.

If the application program server 520 has found the virtual article identifier in the order table, but has not found, according to the second account, the first account matching the second account in the order table, to be specific, the second account is different from the first account, the application program server 520 associates the current bill with the second account according to a preset rule, and the application program server 520 sends, according to the current bill and the second account that are associated, the corresponding virtual article to the second account of the application program in the application program terminal 510.

Therefore, if the user performs an account switching operation in the foregoing process, for example, switches the first account to the second account, where the second account is different from the first account herein, and the user intends to send the virtual article to the second account after the switching, the application program server 520 sends the corresponding virtual article to the second account according to the second account and the current bill that are associated, rather than send the virtual article to another account.

Therefore, in this embodiment of this application, when the application program server 520 sends a virtual article, regardless of whether the user performs a number change operation during use, the application program server 520 can accurately send the corresponding virtual article to a corresponding account according to a requirement of the user, thereby preventing the application program server 520 from sending the virtual article to an erroneous account. Thereby, this embodiment of this application can reduce a possibility of unsuccessfully sending the virtual article, to ensure accuracy of sending the virtual article, thereby improving effective utilization of network resources.

It should be noted that, if the application program server 520 has found the virtual article identifier in the order table, but has not found the first account matching the second account in the order table according to the second account, to be specific, the second account is different from the first account, the application program server 520 may not send the virtual article. Only when the application program server 520 has found the first account matching the second account in the order table according to the second account, the application program server 520 sends the virtual article to the first account. Therefore, the virtual article is prevented from being sent to an erroneous account.

Figure 6A:
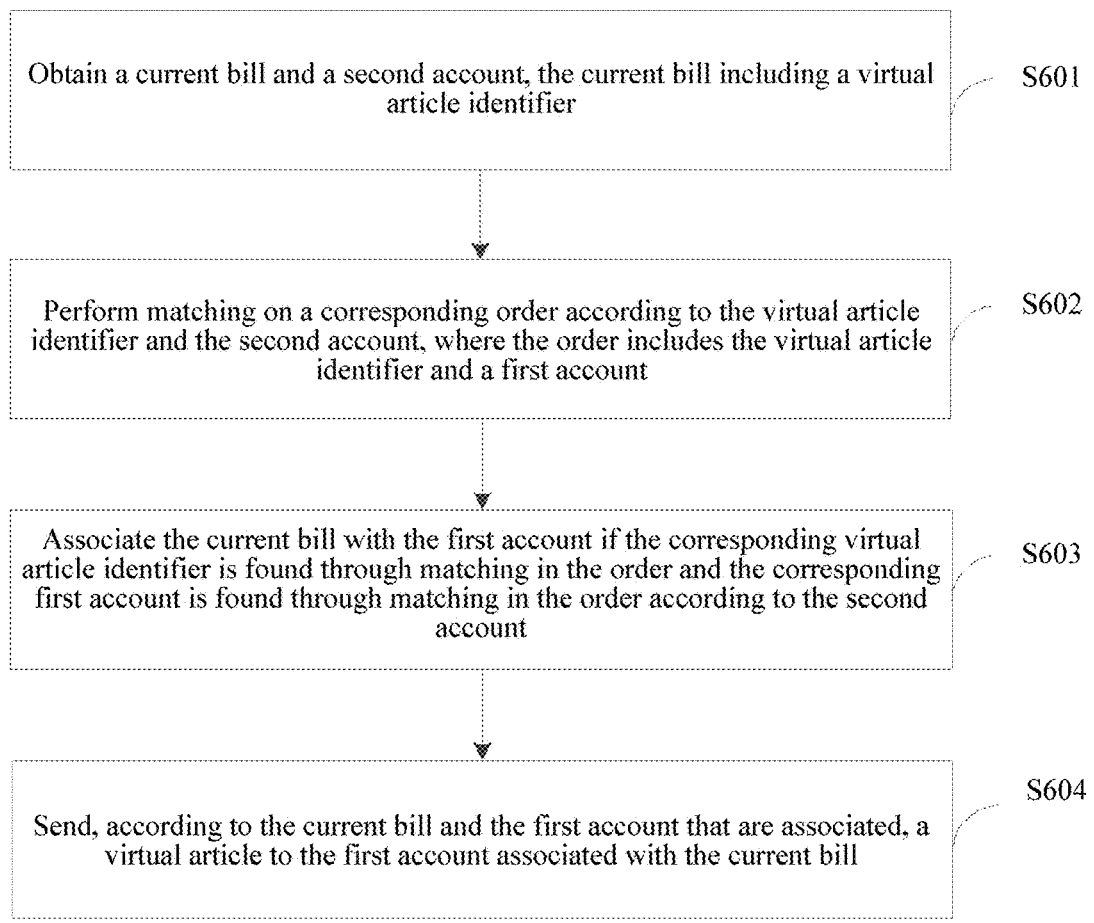
FIG. 6*a* is a schematic flowchart of an information processing method for an application program server according to an embodiment of this application.
Figures 6B, 6C:
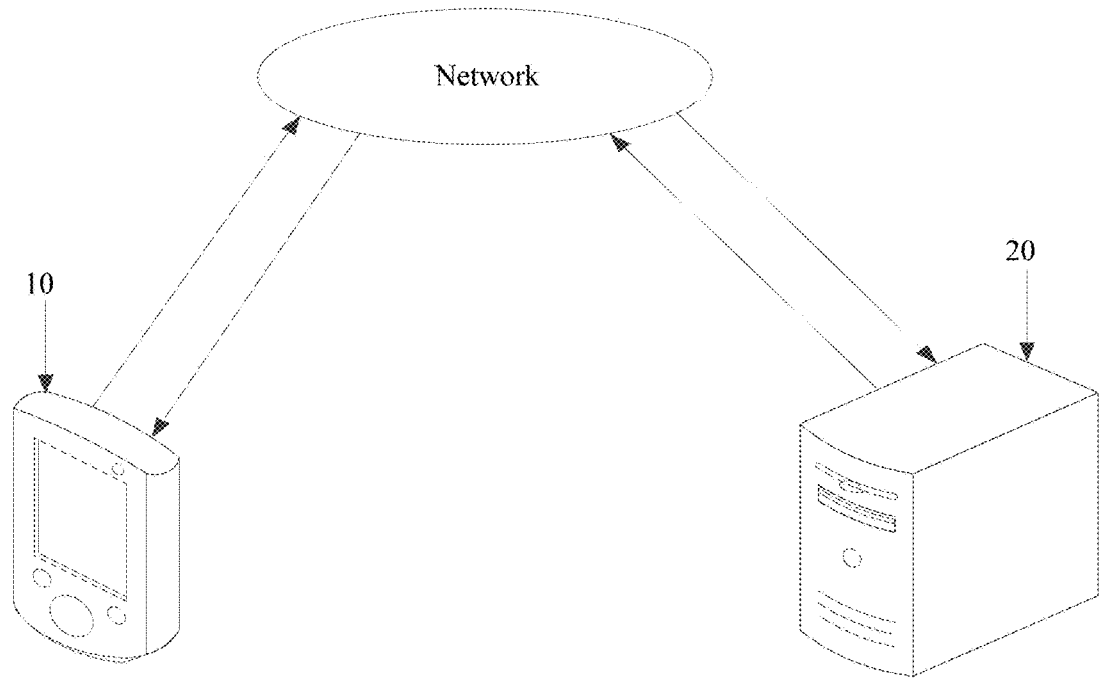
FIG. 6*b* is a schematic diagram of an interaction process of an application program server and an application program terminal in an order processing method according to an embodiment of this application.
FIG. 6*c* is a schematic structural diagram of a bill table according to an embodiment of this application.

FIG. 6*a* is a schematic flowchart of an information processing method for an application program server according to an embodiment of this application. FIG. 6*b* is a schematic diagram of a specific interaction process of an application program server and an application program terminal in an information processing method for an application program server according to an embodiment of this application. The method may include the following steps:

Step S601: Obtain a current bill and a second account, the current bill including a virtual article identifier.

Step S602: Perform matching on a corresponding order according to the virtual article identifier in the current bill and the second account, where the order includes the virtual article identifier and a first account.

Step S603: Associate the current bill with the first account if the corresponding virtual article identifier is found through matching in the order and the corresponding first account is found through matching in the order according to the second account.

Step S604: Send, according to the current bill and the first account that are associated, a virtual article to the first account associated with the current bill.

In step S601, an application program server 520 obtains the current bill and the second account from an application program in an application program terminal 510.

The current bill may further include information such as a date and a time of purchasing the virtual article.

In step S602, the application program server 520 performs matching on the corresponding order according to the virtual article identifier and the second account.

The order may further include a time, a date, and the like during ordering.

In some examples, the application program server 520 searches the corresponding order according to the virtual article identifier and the second account, and specifically searches the order including the first account and the virtual article identifier. More specifically, the application program server 520 searches, according to the second account, the order for the first account matching the second account, and the application program server 520 searches, according to the virtual article identifier, the order for a virtual article identifier the same as the virtual article identifier.

That search for the first account matching the second account is performed according to the second account means that search for the first account the same as the second account is performed according to the second account.

In step S603, the application program server 520 associates the current bill with the first account if the application program server 520 has found the corresponding virtual article identifier through matching in the order and the application program server 520 has found the corresponding first account through matching in the order according to the second account.

If the first account corresponding to the second account is found through matching in the order, the first account is the same as the second account. For example, the first account is an account L, and the second account is also an account L.

For example, the user logs in to the WeChat APP by using an account L, where L is the first account herein, and places an order to purchase 100 Q coins by using the account L, so that the order includes the first account L. Moreover, when the application program server 520 has found the corresponding order according to the virtual article identifier and the second account, the second account is also the account L, and the first account L in the order is the same as the second account L.

Therefore, the application program server 520 may also associate the current bill with the second account.

In some examples, the current bill is associated with the first account in a one-to-one correspondence. To be specific, a one-to-one correspondence is established between the first account and the current bill, to implement bidirectional association.

In some examples, the application program server 520 generates a bill table according to the current bill, and generates an order table according to the order. Referring to FIG. 6*c* and FIG. 6*d* together, FIG. 6*c* is a schematic structural diagram of a bill table, and FIG. 6*d* is a schematic structural diagram of an order table.

In some examples, information in the current bill is stored into the bill table, the first account is stored into the bill table, and the first account is stored onto a location corresponding to the current bill. The corresponding location is defined as a bill item herein. The bill item is specifically content in a dashed box in FIG. 6*c*. Moreover, information of the first account is stored into the order table, information of the current bill is stored into the order table, and the information of the current bill is stored onto a location corresponding to the first account. The corresponding location is defined as an order item herein. The order item is specifically content in a dashed box in FIG. 6*d*.

Referring to FIG. 6*c*, for example, one bill item of the bill table includes a current-bill number (B10001), a current-bill generation time (8 o'clock a.m.), a current-bill generation date (Mar. 17, 2017), a virtual article identifier (Q10001), and a first account (account N).

Referring to FIG. 6*d*, for example, one order item of the order table includes an order generation time (half past 7 o'clock a.m.), an order generation date (Mar. 17, 2017), a virtual article identifier (Q10001), a first account (account N), and a current-bill number (B10001).

It should be noted that, the bill table may further store other information, and the order table may further store other information. For example, a type of a virtual article is Q coins.

Therefore, a one-to-one correspondence is formed between the current bill and the first account by using the bill table and the order table, and as long as the application program server 520 sends the virtual article according to only the current bill including the first account, it may be ensured that the virtual article is sent to the first account, thereby further improving accuracy of sending an article by the application program server 520, so as to further reduce a possibility of unsuccessfully sending the virtual article, and further improve effective utilization of network resources.

It should be noted that, in this embodiment of this application, the application program server 520 may alternatively generate only a bill ticket, rather than generate an order ticket, thereby implementing unidirectional association. For details, refer to FIG. 6c and the foregoing content. Details are not described herein again.

In step S604, the application program server 520 sends the corresponding virtual article to the first account according to the current bill and the first account that are associated. Then, the application program server 520 marks the current bill and the corresponding order as being in a used state.

It should be noted that, after step S601 and before step S602, the information processing method for an application program server may further include the following steps: judging whether the current bill has been used; and performing step S602 if the current bill has not been used; or ending if the current bill has been used. Whether the current bill is valid is judged in advance, and only a valid bill is processed, thereby improving effective utilization of network resources.

It can be known from the foregoing that, in the information processing method for an application program server according to this embodiment of this application, a current bill and a second account are first obtained, the current bill including a virtual article identifier; then matching is performed on a corresponding order according to the virtual article identifier and the second account, where the order includes a first account and the virtual article identifier, and finally the first account in the order found through matching is associated with the current bill; and a corresponding virtual article is sent to the first account according to the first account and the current bill that are associated.

Therefore, the application program server sends the virtual article to the correct first account. The application program server always sends the corresponding virtual article to the first account according to the first account and the current bill that are associated, so as to reduce a possibility of unsuccessfully sending the virtual article, and ensure accuracy of sending the virtual article, thereby improving effective utilization of network resources.

Figure 7A:
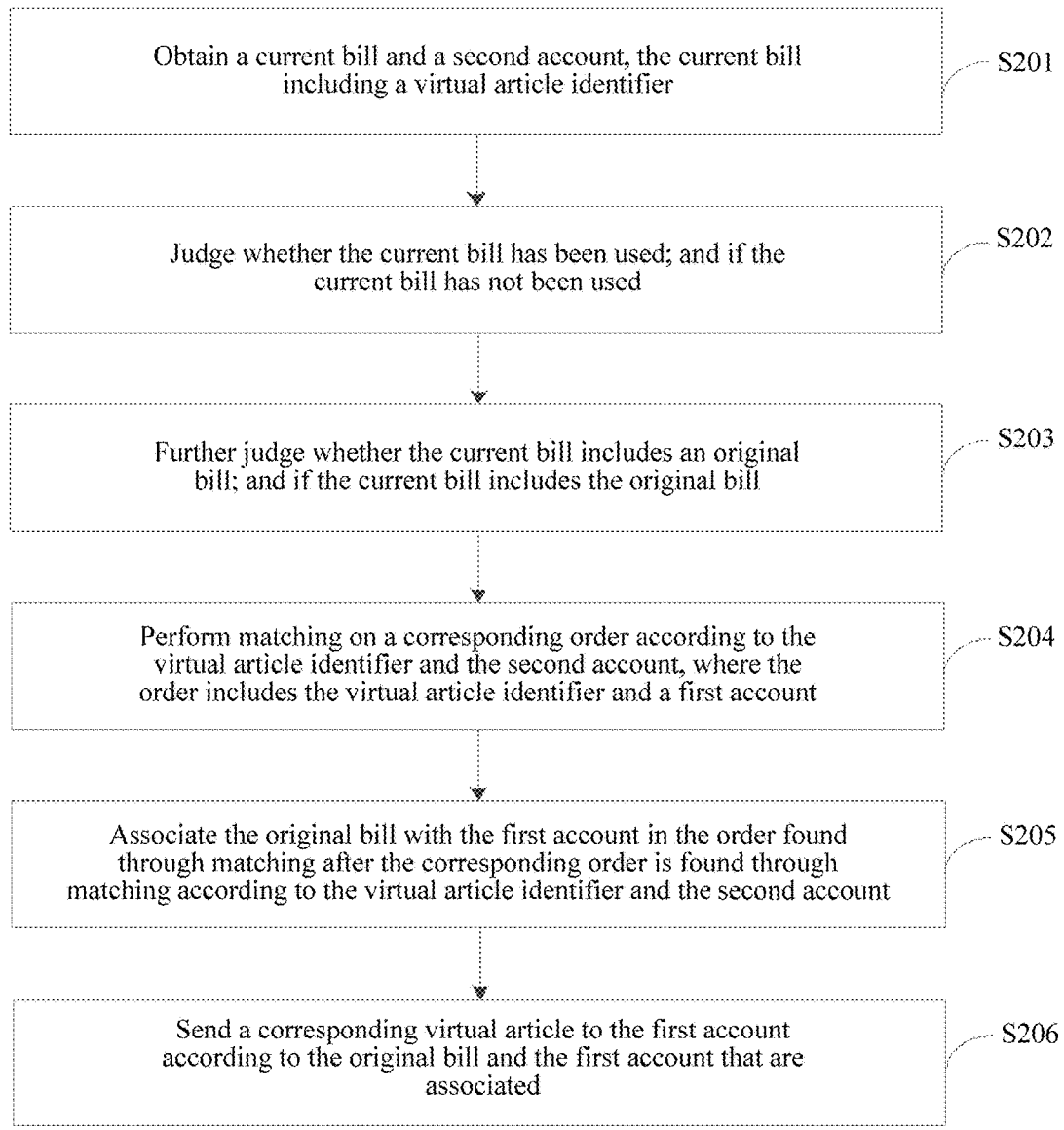
FIG. 7*a* is a schematic diagram of an information processing method for an application program server according to an embodiment of this application.

FIG. 7a is a schematic flowchart of an information processing method for an application program server according to an embodiment of this application. Referring to FIG. 7a together with FIG. 6b, the information processing method may include the following steps:

Step S201: Obtain a current bill and a second account, the current bill including a virtual article identifier.

Step S202: Judge whether the current bill has been used; and perform step S203 if the current bill has not been used; or end if the current bill has been used.

Step S203: Further judge whether the current bill includes an original bill, where the original bill is a bill of the first time of purchase of automatically purchasing a virtual article in a preset time; and perform step S204 if the current bill includes the original bill; or perform step S202 if the current bill does not include the original bill.

Step S204: Perform matching on a corresponding order according to the virtual article identifier and the second account, where the order includes the virtual article identifier and a first account.

Step S205: Associate the original bill with the first account after the corresponding order is found through matching according to the virtual article identifier and the second account.

Step S206: Send, according to the original bill and the first account that are associated, a corresponding virtual article to the first account associated with the original bill.

For step S201, refer to step S601.

In step S202, an application program server 520 judges whether the current bill has been used; and step S203 is performed if the current bill has not been used; or the process ends if the current bill has been used. Whether the current bill is valid is judged in advance, and only a valid bill is processed, thereby improving effective utilization of network resources.

In step S203, an application program server 520 further judges whether the current bill includes the original bill; and step S204 is performed if the current bill includes the original bill. The original bill is a bill of the first time of purchase of automatically purchasing a virtual article in a preset time. In some examples, the original bill is a bill formed after an application program in an application program terminal 510 places an order for the first time by using the first account and performs fee deduction by using a payment server 530, and includes an automatic renewal type. To be specific, the original bill includes an automatic renewal item.

For example, a user purchases a virtual article of the automatic renewal type in a year. In some more examples, for example, a user purchases an annual membership of the automatic renewal type in a Tencent video server, and the Tencent video server sends the membership to a Tencent video APP of the user in a specified time in each month. Moreover, a bill generated when the user purchases the membership for the first time is an original bill, but a bill formed later in the specified time in each month is not an original bill. A bill formed in a specified time in a current month is a current bill.

For step S204, refer to step S602.

In step S205, after the application program server 520 has found the corresponding order through matching according to the virtual article identifier in the current bill and the second account, the application program server 520 associates the original bill with the first account.

In some examples, the application program server 520 has found the corresponding virtual article identifier through matching in the order, the application program server 520 has found the corresponding first account through matching in the order according to the second account, and the application program server 520 associates the original bill with the first account.

In some examples, the first account is associated with the original bill in a one-to-one correspondence. To be specific, a one-to-one correspondence is established between the first account and the original bill, to implement bidirectional association.

In some examples, the application program server 520 generates a bill table according to the original bill, and generates an order table according to the order. Referring to FIG. 7b and FIG. 7c together, FIG. 7b is a schematic structural diagram of a bill table, and FIG. 7c is a schematic structural diagram of an order table.

In some examples, information in the original bill is stored into the bill table, the first account is stored into the bill table, and the first account is stored onto a location corresponding to the original bill. The corresponding location is defined as a bill item herein. The bill item is specifically content in a dashed box in FIG. 7b. Moreover, information of the first account is stored into the order table, information of the original bill is stored into the order table, and the information of the original bill is stored onto a location corresponding to the first account. The corresponding location is defined as an order item herein. The order item is specifically content in a dashed box in FIG. 7c.

Referring to FIG. 7b, for example, one bill item of the bill table includes an original-bill number (B1), automatic renewal (1/12), an original-bill generation time (8 o'clock a.m.), an original-bill generation date (Mar. 17, 2017), a virtual article identifier (Q10001), and a first account (account N). 1/12 in the automatic renewal indicates that automatic renewal has been for one month in annual automatic renewal.

Referring to FIG. 7c, for example, one order item of the order table includes an order generation time (half past 7 o'clock a.m.), an order generation date (Mar. 17, 2017), a virtual article identifier (Q10001), a first account (account N), an original-bill number (B1), and automatic renewal (1/12).

It should be noted that, the bill table may further store other information, and the order table may further store other information. For example, a type of a virtual article is Q coins.

Therefore, a one-to-one correspondence is formed between the original bill and the first account by using the bill table and the order table, and as long as the application program server 520 sends the virtual article according to only the original bill including the first account, it may be ensured that the virtual article is sent to the first account, thereby further improving accuracy of sending an article by the application program server 520, so as to further reduce a possibility of unsuccessfully sending the virtual article, and further improve effective utilization of network resources.

It should be noted that, in this embodiment of this application, the application program server 520 may alternatively generate only a bill ticket, rather than generate an order ticket, thereby implementing unidirectional association. For details, refer to FIG. 7b and the foregoing content. Details are not described herein again.

In step S206, the application program server 520 sends the corresponding virtual article to the first account according to the original bill and the first account that are associated. Then, the application program server 520 modifies automatic renewal in the bill table. For example, automatic renewal lasts for 12 months, where if automatic renewal has lasted for two months, 2/12 is marked in the bill table.

It can be known from the foregoing that, in the information processing method for an application program server according to this embodiment of this application, a current bill and a second account are first obtained, the current bill including a virtual article identifier; then whether the current bill has been used is judged, whether the current bill includes an original bill is further judged if the current bill has not been used, and matching is performed on a corresponding order according to the virtual article identifier and the second account if the current bill includes the original bill, where the order includes a first account and the virtual article identifier; and finally the first account is associated with the original bill, and a corresponding virtual article is sent to the first account according to the first account and the original bill that are associated.

Therefore, the application program server sends the virtual article to the correct first account. The application program server always sends the corresponding virtual article to the first account according to the first account and the current bill that are associated, so as to reduce a possibility of unsuccessfully sending the virtual article, and ensure accuracy of sending the virtual article, thereby improving effective utilization of network resources.

Figure 8A:
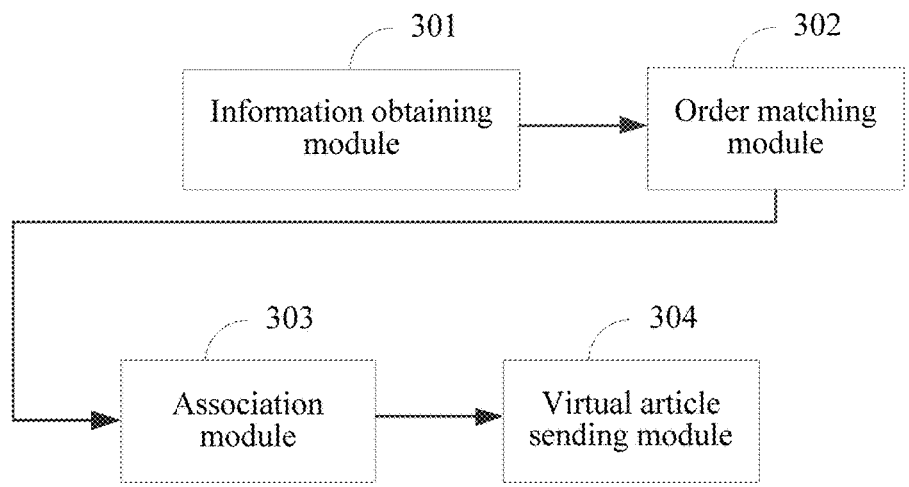
FIG. 8*a* is a schematic structural diagram of an information processing apparatus according to an embodiment of this application.

FIG. 8a is a schematic structural diagram of an information processing apparatus for an application program server according to an embodiment of this application. Referring to FIG. 8a together with FIG. 6a to FIG. 6d, the information processing apparatus according to this embodiment of this application may include an information obtaining module 301, an order matching module 302, an association module 303, and a virtual article sending module 304.

The information processing apparatus may be integrated in the application program server 520 that has a storage module and in which a microprocessor is installed to have a computing capability, and is mainly configured to: obtain a current bill and a second account, the current bill including a virtual article identifier; perform matching on a corresponding order according to the virtual article identifier in the current bill and the second account, where the order includes the virtual article identifier and a first account; then associate the current bill with the first account if the corresponding virtual article identifier is found through matching in the order and the corresponding first account is found through matching in the order according to the second account; and send, according to the current bill and the first account that are associated, a virtual article to the first account associated with the current bill.

The information obtaining module 301 is configured to obtain the current bill and the second account, the current bill including the virtual article identifier.

The order matching module 302 is configured to perform matching on the corresponding order according to the virtual article identifier and the second account.

In some examples, the order matching module 302 searches the corresponding order according to the virtual article identifier and the second account. In some examples, the order matching module 302 searches the order including the first account and the virtual article identifier. In some more examples, the order matching module 302 searches, according to the second account, the order for the first account matching the second account, and the order matching module 302 searches, according to the virtual article identifier, the order for a virtual article identifier the same as the virtual article identifier.

That search for the first account matching the second account is performed according to the second account means that search for the first account the same as the second account is performed according to the second account.

The association module 303 is configured to associate the current bill with the first account if the corresponding virtual article identifier is found through matching in the order and the corresponding first account is found through matching in the order according to the second account.

In some examples, the association module 303 associates the first account with the current bill in a one-to-one correspondence. To be specific, the association module 303 establishes a one-to-one correspondence between the first account and the current bill, to implement bidirectional association.

For details, refer to step S603, FIG. 6c, and FIG. 6d. Details are not described herein again.

The virtual article sending module 304 is configured to send the corresponding virtual article to the first account according to the first account and the current bill that are associated.

It should be noted that, the information processing apparatus according to this embodiment of this application may further include a first judging module and an information marking module.

The first judging module is configured to judge whether the current bill has been used, and perform no operation if the current bill has been used. If the first judging module judges that the current bill has not been used, the order matching module 302 is further configured to perform matching on the corresponding order according to the virtual article identifier and the second account. Whether the current bill is valid is judged in advance, and only a valid bill is processed, thereby improving effective utilization of network resources.

The information marking module is configured to mark the current bill and the order corresponding to the current bill as being in a used state.

It can be known from the foregoing that, in the information processing apparatus for an application program server according to this embodiment of this application, the information obtaining module 301 first obtains the current bill and the second account, the current bill including the virtual article identifier; then the order matching module 302 performs matching on the corresponding order according to the virtual article identifier and the second account, where the order includes the virtual article identifier and the first account; then the association module 303 associates the current bill with the first account that is found through matching in the order; and finally the virtual article sending module 304 sends the corresponding virtual article to the first account according to the first account and the current bill that are associated.

Therefore, the virtual article sending module 304 sends the virtual article to the correct first account. The virtual article sending module 304 always sends the corresponding virtual article to the first account according to the first account and the current bill that are associated, so as to reduce a possibility of unsuccessfully sending the virtual article, and ensure accuracy of sending the virtual article, thereby improving effective utilization of network resources.

Figure 8B:
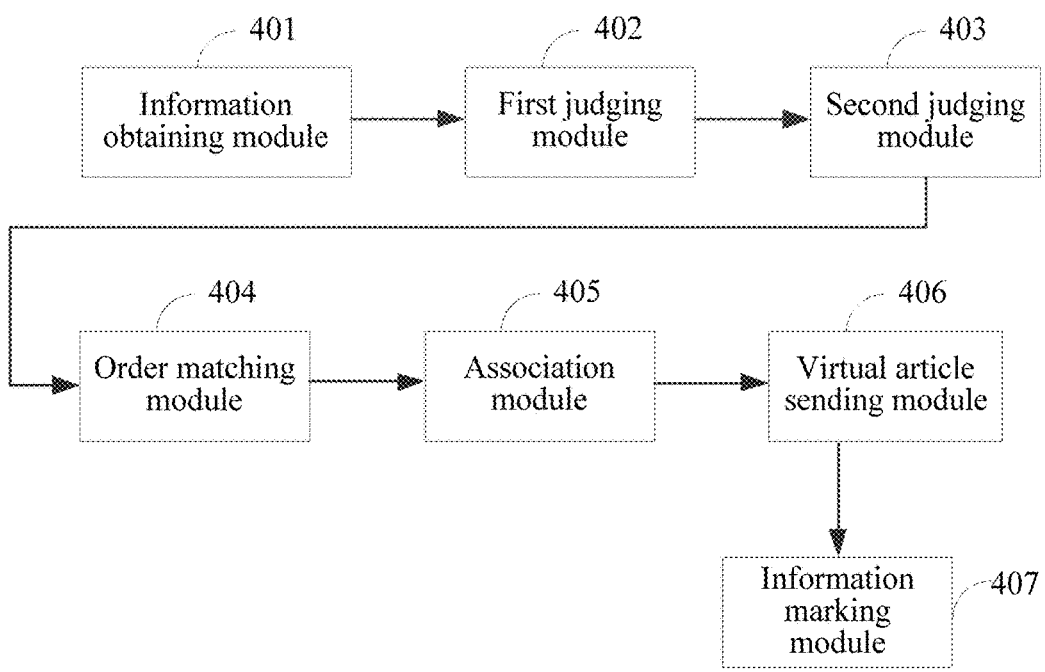
FIG. 8*b* is a schematic structural diagram of an information processing apparatus according to an embodiment of this application.

FIG. 8b is another schematic structural diagram of an information processing apparatus for an application program server according to an embodiment of this application. Referring to FIG. 8b together with FIG. 6b, the information processing apparatus includes: an information obtaining module 401, a first judging module 402, a second judging module 403, an order matching module 404, an association module 405, a virtual article sending module 406, and an information marking module 407.

The information obtaining module 401 is configured to obtain a current bill and a second account, the current bill including a virtual article identifier.

The first judging module 402 is configured to judge whether the current bill has been used, and perform no operation if the current bill has been used. If the current bill has not been used, the second judging module 403 is further configured to judge whether the current bill includes an original bill. Whether the current bill is valid is judged in advance, and only a valid bill is processed, thereby improving effective utilization of network resources.

The second judging module 403 is configured to further judge whether the current bill includes the original bill, where the original bill is a bill of the first time of purchase of automatically purchasing a virtual article in a preset time; and if the current bill includes the original bill, the order matching module 404 is configured to perform matching on a corresponding order according to the virtual article identifier and the second account. If the current bill does not include the original bill, the order matching module 404 is also configured to perform matching on a corresponding order according to the virtual article identifier and the second account.

The order matching module 404 is configured to perform matching on the corresponding order according to the virtual article identifier and the second account.

In some examples, the order matching module 404 searches the corresponding order according to the virtual article identifier and the second account. In some examples, the order matching module 402 searches the order including the first account and the virtual article identifier. In some more examples, the order matching module 404 searches, according to the second account, the order for the first account matching the second account, and the order matching module 404 searches, according to the virtual article identifier, the order for a virtual article identifier the same as the virtual article identifier.

That search for the first account matching the second account is performed according to the second account means that search for the first account the same as the second account is performed according to the second account.

If the second judging module 403 further judges that the current bill includes the original bill, the association module 405 is configured to associate the original bill with the first account after the corresponding order is found through matching according to the virtual article identifier and the second account.

In some examples, the association module 405 finds the corresponding virtual article identifier through matching in the order, the association module 405 finds the corresponding first account through matching in the order according to the second account, and the association module 405 associates the original bill with the first account.

In some examples, the association module 405 associates the first account with the original bill in a one-to-one correspondence. To be specific, the association module 405 establishes a one-to-one correspondence between the first account and the original bill, to implement bidirectional association.

For details, refer to step S205, FIG. 7b, and FIG. 7c. Details are not described herein again.

The virtual article sending module 206 is configured to send the corresponding virtual article to the first account according to the first account and the original bill that are associated.

The information marking module 407 is configured to modify automatic renewal in the bill table.

It can be known from the foregoing that, in the information processing apparatus for an application program server according to this embodiment of this application, at first, the information obtaining module 401 is configured to obtain the current bill and the second account, the current bill including the virtual article identifier; then the first judging module 402 is configured to judge whether the current bill has been used; if the current bill has not been used, the second judging module 403 is further configured to judge whether the current bill includes the original bill; if the current bill includes the original bill, the order matching module 404 performs matching on the corresponding order according to the virtual article identifier and the second account, where the order includes the virtual article identifier and the first account; then the association module 405 associates the first account that is found through matching in the order with the original bill; the virtual article sending module 406 sends the corresponding virtual article to the first account according to the first account and the original bill that are associated; and finally the information marking module 407 marks the current bill and the order as being in the used state.

Therefore, the virtual article sending module 406 sends the virtual article to the correct first account. The virtual article sending module 406 always sends the corresponding virtual article to the first account according to the first account and the original bill that are associated, so as to reduce a possibility of unsuccessfully sending the virtual article, and ensure accuracy of sending the virtual article, thereby improving effective utilization of network resources.

In a specific implementation, the foregoing modules may be implemented as independent entities, or may be combined arbitrarily, or may be implemented as the same entity or several entities. For specific implementations of the foregoing modules, refer to the foregoing method embodiments. Details are not described herein again.

The order processing apparatus may be specifically integrated in a network device such as a server or a gateway.

Figure 9:
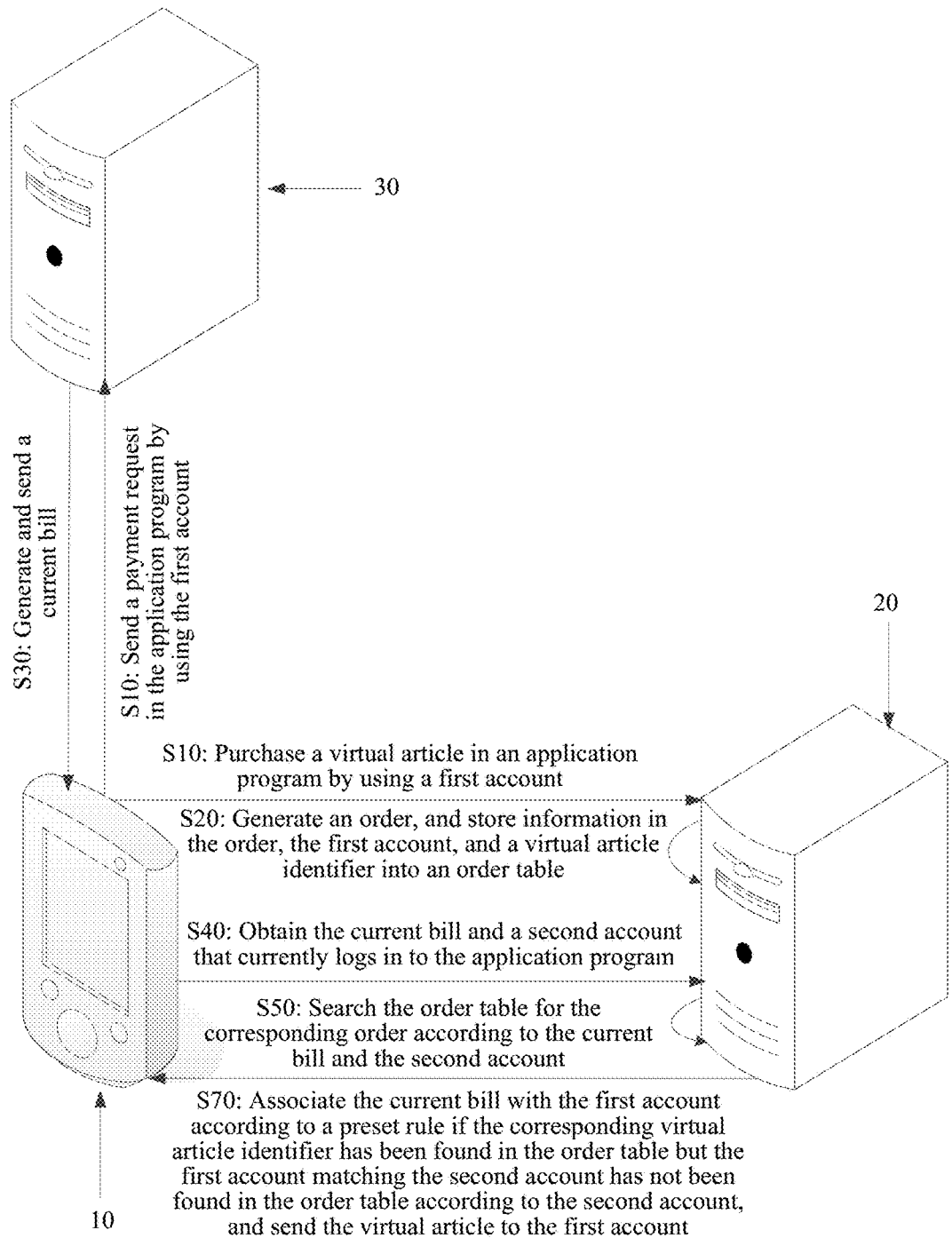
FIG. 9 is a schematic diagram of a scenario of an information processing method for an application program server according to an embodiment of this application.

FIG. 9 is a schematic diagram of another scenario of an information processing method for an application program server according to an embodiment of this application. Referring to FIG. 9 together with FIG. 5a to FIG. 5h, the information processing method is different from the information processing method shown in FIG. 5a in that the information processing method further includes step S70. Step S10, step S20, step S30, step S40, and step S50 of the information processing method according to this embodiment of this application are respectively the same as step S10, step S20, step S30, step S40, and step S50 shown in FIG. 5a. Details are not described herein again. Additionally, step S10, step S20, step S30, step S40, step S50, and another step of the information processing method according to this embodiment of this application may also be similar to step S601 and step S602 shown in FIG. 6a, and may be further similar to step S201, step S202, step S203, and step S204 shown in FIG. 7a.

In this embodiment of this application, in step S70, if a corresponding virtual article identifier has been found through matching in an order according to a virtual article identifier, and a corresponding first account has not been found through matching in the order according to a second account, a current bill is associated with the second account according to a preset rule; and a corresponding virtual article is sent to the second account associated with the current bill according to the current bill and the second account that are associated.

In some examples, an application program server 520 searches an order table for the corresponding virtual article identifier, and searches the order table for the corresponding first account according to the second account; and has found the corresponding virtual article identifier in the order table, but has not found the corresponding first account in the order table according to the second account, that is, has not found the first account the same as the second account in the order table. Then, the current bill is associated with the second account according to the preset rule, and the corresponding virtual article is sent to the second account associated with the current bill according to the current bill and the second account that are associated.

In this embodiment of this application, the preset rule may be a continuous preset quantity of times. For example, a user logs in to an application program by using the same second account for continuous two times, continuous three times, continuous five times, continuous seven times, or the like, and sends the current bill to the application program server 520. In this case, the second account is a target account by default, that is, an account through which a virtual article desired by the application program server 520 is sent. Therefore, the second account is associated with the current bill, and the virtual article is sent to the associated second account. For details of establishment of an association relationship between the second account and the current bill, refer to establishment of an association relationship between the first account and the current bill in the second embodiment, or establishment similar to establishment of an association relationship between the first account and the original bill in the foregoing embodiment. Details are not described herein again. Moreover, for specific content about sending, by the application program server 520, the virtual article to the second account, also refer to the foregoing embodiment. Details are not described herein again.

The foregoing is specific content in which the current bill does not include the original bill in this embodiment of this application, and the following describes a situation in which the current bill includes the original bill. If the current bill includes the original bill, the original bill includes an automatic renewal item, that is, an automatic purchase type. For details, refer to the third embodiment. Details are not described herein again.

In this embodiment of this application, the application program server 520 judges whether the current bill includes the original bill, where the original bill is a bill of the first time of purchase of automatically purchasing a virtual article in a preset time; and if the current bill includes the original bill and a corresponding first account has not been found through matching in the order according to a second account, associate the original bill with the second account according to the preset rule, and sends, according to the original bill and the first account that are associated, the corresponding virtual article to the second account associated with the original bill.

In this embodiment of this application, the preset rule may be a continuous preset quantity of times. For example, a user logs in to an application program by using the same second account for continuous two times, continuous three times, continuous five times, continuous seven times, or the like, and sends the current bill to the application program server 520. In this case, the second account is a target account by default, that is, an account through which a virtual article desired by the application program server 520 is sent. Therefore, the second account is associated with the current bill, and the virtual article is sent to the associated second account. In some examples, for example, if the second account is used when the current bill is sent to the application program server 520 for continuous two or more times, the quantity of times is set for an automatic purchase renewal period in some examples. For example, for monthly automatic purchase renewal, if all current bills in continuous two months are sent to the application program server 520 by using the second account, the original bill is associated with the second account in the second month, and a virtual article is sent to the second account. For another example, for a weekly automatic purchase renewal type, if all current bills in continuous four weeks are sent to the application program server 520 by using the second account, the original bill is associated with the second account in the fourth week, and a virtual article is sent to the second account.

In this embodiment of this application, the preset rule may be that an interval time length between the current bill and the order corresponding to the original bill is greater than a preset time length. The preset time length may be 15 days, or may certainly be 10 days, 20 days, or the like. If the interval time length between the current bill and the order corresponding to the original bill is greater than the preset time length, the original bill is associated with the second account, and the corresponding virtual article is sent to the second account associated with the original bill according to the original bill and the second account that are associated. For example, if an arrival time of the current bill of the automatic purchase renewal type is later than a specified time in the original bill because balance of the first account is insufficient, to be specific, the arrival time of the current bill exceeds a period from a service termination time in a previous period, that is, exceeds the preset time length, and the second account places an order in this period, the second account is associated with the original bill, and the virtual article is sent to the second account.

It should be noted that, step S70 in this embodiment of this application may be completed by using the association module 303 and the virtual article sending module 304 in the fourth embodiment, or may be completed by using the association module 405 and the virtual article sending module 406 in the fifth embodiment. For details, refer to the fourth embodiment and the fifth embodiment. Details are not described herein again.

Figure 10:
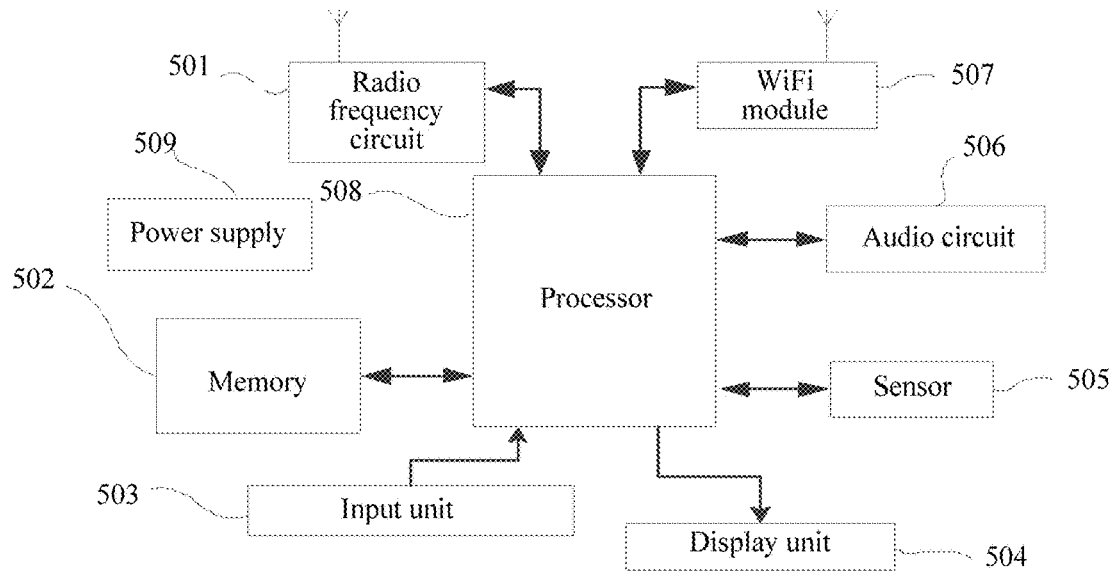
FIG. 10 is a schematic structural diagram of an application program server according to an embodiment of this application.

An embodiment of this application further provides an application program server. As shown in FIG. 10, The application program server may include components such as a radio frequency (RF) circuit 501, a memory 502 including one or more computer readable storage media, an input module 503, a display module 504, a sensor 505, an audio circuit 506, a wireless fidelity (WiFi) module 507, a processor 508 including one or more processing cores, and a power supply 509. An application program server structure shown in FIG. 10 does not constitute a limit on the application program server. The application program server may include more or fewer parts than those shown in the figure, may combine some parts, or may have different part arrangements.

The memory 502 may be configured to store a software program and module. The processor 508 runs the software program and module stored in the memory 502, so as to execute various function applications and data processing. The memory 502 may mainly include a program storage area and a data storage area. The program storage area may store an operating system, an application program required by at least one function (such as a function of obtaining an order, a function of obtaining a bill, and a function of sending a virtual article), and the like. The data storage area may store data (such as an order table and a bill table) created according to use of the application program server, and the like. In addition, the memory 502 may include a high speed random access memory, and may also include a non-volatile memory such as at least one magnetic disk storage device, a flash memory, or another volatile solid-state storage device. Accordingly, the memory 502 may further include a memory controller, so that the processor 508 and the input module 503 access the memory 502.

The processor 508 is a control center of the application program server, and is connected to various parts of the entire application program server by using various interfaces and lines. By running or executing a software program and/or module stored in the memory 502, and invoking data stored in the memory 502, the processor 701 executes various functions of a terminal and performs data processing, thereby monitoring an entire mobile phone. In some examples, the processor 508 may include one or more processing cores.

The processor 508 in the application program server may load, according to the following instructions, executable files corresponding to processes of one or more application programs into the memory 502. The processor 508 runs the application programs stored in the memory 502, to implement various functions, for example:

obtaining a current bill and a second account, the current bill including a virtual article identifier;

performing matching on a corresponding order according to the virtual article identifier and the second account, where the order includes a first account, and the first account is associated with the virtual article identifier;

associating the first account with the current bill; and sending a corresponding virtual article to the first account according to the first account and the current bill that are associated.

In some examples, the processor 508 may be further configured to judge whether the current bill includes an original bill; and if the current bill includes the original bill, the step of associating the first account with the current bill includes:

associating the first account in the order with the original bill; and the step of sending a corresponding virtual article to the first account according to the first account and the current bill that are associated includes:

sending the corresponding virtual article to the first account according to the first account and the original bill that are associated.

In some examples, the processor 508 may be further configured to associate the first account with the current bill in a one-to-one correspondence.

In some examples, the processor 508 may be further configured to mark the bill and the order as being in a used state.

In some examples, the processor 508 may be further configured to judge whether order information includes an automatic renewal item.

It can be known from the foregoing that, in the application program server provided in this embodiment, a current bill and a second account are first obtained, the current bill including a virtual article identifier; then matching is performed on a corresponding order according to the virtual article identifier and the second account, where the order includes a first account, and the first account is associated with the virtual article identifier; and finally the first account is associated with the current bill, and a corresponding virtual article is sent to the first account according to the first account and the current bill that are associated. Therefore, this embodiment of this application can reduce a possibility of unsuccessfully sending the virtual article, ensure purchase experience of a user in an application as much as possible, guarantee user interests, and reduce complaints.

Figure 11:
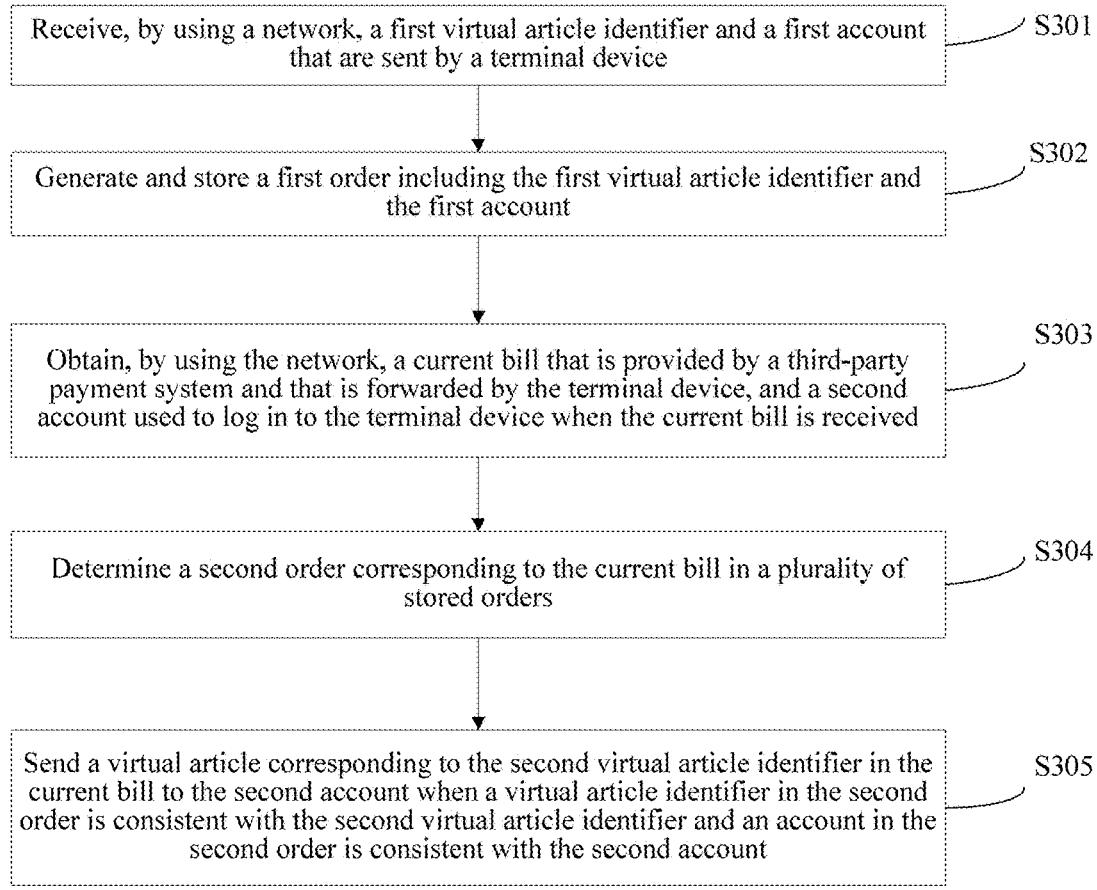
FIG. 11 is a schematic diagram of an information processing method according to an embodiment of this application.

FIG. 11 shows an information processing method according to an embodiment of this application. The information processing method may be applied to an application program server. The application program server may include one or more servers. For example, the same physical device may implement all functions of the application program server; or functions of the application program server may be implemented by using a server set of a server in the BOSS shown in FIG. 2b, a renewal background server, a channel background server, and the like. The method may include the following steps:

S301. Receive, by using a network, a first virtual article identifier and a first account that are sent by a terminal device.

The first virtual article identifier is determined by the terminal device in response to an operation of a user on a virtual article presentation interface, and the first account is an account used to log into the terminal device when the operation occurs.

S302. Generate and store a first order including the first virtual article identifier and the first account.

S303. Obtain, by using the network, a current bill that is provided by a third-party payment system and that is forwarded by the terminal device, and a second account used to log into the terminal device when the current bill is received.

The current bill includes a second virtual article identifier.

S304. Determine a second order corresponding to the current bill in a plurality of stored orders.

S305. Send a virtual article corresponding to the second virtual article identifier in the current bill to the second account when a virtual article identifier in the second order is the same as the second virtual article identifier and an account in the second order is the same as the second account.

In the embodiments, the second order corresponding to the current bill may be searched for by using an article identifier and an account, or an order corresponding to an original bill in the current bill may be searched for as the second order. The original bill is a bill corresponding to the first time of purchasing the virtual article after the user subscribes to automatically purchase the virtual article. For example, a current bill provided by a third-party payment system may include an identifier of the current bill and an identifier of an original bill corresponding to the bill. For non-automatic renewal purchase, or for the first time of purchase of automatic renewal purchase, an identifier of an original bill in a current bill is empty or is an identifier of the current bill. For the non-first time of purchase of automatic renewal, an identifier of an original bill in a current bill is an identifier of a bill corresponding to the first time of purchasing the article by using the account after subscribing to automatic renewal purchase. The application server may judge, according to information in the current bill, whether purchase corresponding to the current bill is renewal purchase. If it is determined that the current bill is non-automatic renewal purchase or the first time of purchase of automatic renewal purchase, the application server may search the plurality of stored orders for an order matching the second virtual article identifier and the second account in the current bill as the second order. If it is determined that the current bill is non-first time purchase of automatic renewal purchase, the application server may search the plurality of stored orders for an order associated with the identifier of the original bill in the current bill as the second order.

In some examples, the application server may further obtain, when it is determined that the second order has not been found in the plurality of orders, a third account and a third order that correspond to the current bill from configuration information, associate the current bill with the third order, and send the virtual article corresponding to the second virtual article identifier in the current bill to the third account. When the second order corresponding to the current bill has not been found, the application server may suspend processing the current bill. Then, the configuration information may be read from a preset storage location periodically or according to a request, information about a manner of processing the current bill is obtained from the configuration information, and the current bill is processed according to the information. The configuration information may be information that is manually verified and entered. For example, a customer service staff of an application program verifies a purchase situation of a user, confirms an account for receiving a virtual article, and then enters the configuration information; or an application program may provide a user complaint interface, verify an identity, an order, and payment information of a user, and then store order information, payment information, goods receipt account information, and the like entered by the user into the configuration information in the application server. The application server may find a to-be-processed bill and an order according to the configuration information, provide a virtual article to a designated account according to the configuration information, and establish an association between the bill and the order.

In some examples, the application server may associate, when the account in the second order is inconsistent with the second account in the current bill and it is determined that the current bill satisfies a preset condition, the current bill with the second account, and send the virtual article corresponding to the second virtual article identifier in the current bill to the second account.

In some examples, the application server may obtain a first time in the current bill; obtain a second time in a latest bill associated with the second order; and search, when a time interval between the first time and the second time exceeds a preset time length corresponding to the second virtual article identifier, the plurality of stored orders for a third order matching the second virtual article identifier in the current bill and the second account, remove an association relationship between an original bill in the current bill and the second order, associate the current bill and the original bill with the third order, and determine that the recorded information satisfies the preset condition, where the original bill is a bill corresponding to the first time of purchasing the virtual article after the user subscribes to automatically purchase the virtual article. For example, for automatic renewal purchase, the third-party payment system attempts, before a validity period of previous purchase ends, automatic fee deduction to perform renewal, and again attempts fee deduction in a set renewal period if fee deduction is unsuccessful. If fee deduction is still unsuccessful in the renewal period, subscription to the automatic renewal is cancelled unilaterally. The user may place an order again by using the application program, the application server generates a new order, and the third-party payment system may still associate an original bill of the cancelled automatic renewal with a new automatic renewal bill. By using the foregoing method, the application server may detect that automatic renewal corresponding to the original bill is cancelled due to expiration, and the application server should store a new order corresponding to automatic renewal purchase of new subscription. Therefore, the association between the original bill and the original order is cancelled, and the original bill is associated with the new order. In this way, an automatic renewal purchase service provided by the application server may be more reliable. The preset time length may be determined according to a renewal period of a virtual article in the bill and a renewal period of the third-party payment system, for example, may be a sum of the two. In some examples, When the time interval between the first time and the second time does not exceed the preset time length corresponding to the second virtual article identifier, the application server may provide the virtual article to the account in the original order corresponding to the original bill.

In some examples, the application server may record a quantity of times of continuously receiving the current bill sent by the terminal device by using the second account; and determine, when the recorded quantity of times reaches a preset quantity of times, that the current bill satisfies the preset condition.

In some examples, the application server may judge whether the current bill has been used; and perform, if it is determined that the current bill has not been used, a step of determining the second order corresponding to the current bill in the plurality of stored orders; or end if it is determined that the current bill has been used. After performing processing (for example, order association and delivery) on a bill provided by the application program client, the application server may return, to the application program client, information indicating that the bill has been processed. When having not received the feedback information because of some reasons, the application program client may resend the bill to the application server. To prevent the same bill from being processed for a plurality of times, the application server may record information indicating whether each bill has been used. When having received a bill, the application server first locally search for whether the bill has been stored, and whether the bill has been processed.

For example, after a virtual article corresponding to a virtual article identifier in a second bill is sent to a fourth account, the application server may mark the second bill as being in a used state, and stores the second bill. After having received the current bill sent by the client, the application server may search stored bills for a bill having an identifier same as that of the current bill; and determine, when the found bill is marked as being in the used state, that the current bill has been used; or determine, when the bill has not been found or the found bill is not marked as being in the used state, that the current bill has not been used.

For example, after the virtual article corresponding to the virtual article identifier in the second bill is sent to the fourth account, the application server may associate, after the virtual article corresponding to the virtual article identifier in the second bill is sent to the fourth account corresponding to the fourth order, the second bill with the fourth order, and the application server may search bill information associated with the plurality of stored orders for a bill having an identifier same as that of the current bill; and determine, when the bill has been found, that the current bill has been used; or determine, when the bill has not been found, that the current bill has not been used.

In the foregoing embodiments, the description of each embodiment has respective focuses. For a part that is not described in detail in an embodiment, refer to a detailed description in the foregoing order processing method. Details are not described herein again.

The information processing apparatus provided in the embodiments of this application is, for example, a computer, a tablet computer, or a mobile phone having a touch function. The information processing apparatus and the information processing method in the foregoing embodiments belong to the same concept. Any method provided in the embodiments of the information processing method may be running on the information processing apparatus. For details of a specific implementation, refer to the embodiments of the information processing method. Details are not described herein again.

It should be noted that, for the information processing method of this application, a person of ordinary skill in the art may understand that all or some procedures of the information processing method of the embodiments of this application may be implemented by using a computer program by controlling related hardware. The computer program may be stored in a computer readable storage medium, for example, stored in a memory of an application program server, and be executed by at least one processor in the application program server. When the computer program is running, the procedures of the information processing method in the embodiments are performed. The foregoing storage medium may include: a magnetic disk, an optical disc, a read-only memory (ROM), or a random access memory (RAM).

The modules of the information processing apparatus in the embodiments of this application may be integrated into one processing chip, or each of the modules may exist alone physically, or two or more modules are integrated into one module. The integrated module may be implemented in a form of hardware, or may be implemented in a form of a software functional module. When the integrated module is implemented in the form of a software functional module and sold or used as an independent product, the integrated unit may be stored in a computer readable storage medium. The storage medium is, for example, an ROM, a magnetic disk, or an optical disc.

The information processing method, the information processing apparatus and the application program server provided in the embodiments of this application are described above in detail. Although the principles and implementations of this application are described by using specific embodiments in the specification, the foregoing descriptions of the embodiments are only intended to help understand the method and core idea of the method of this application. Meanwhile, a person of ordinary skill in the art may make modifications to the specific implementations and application range according to the idea of this application. In conclusion, the content of the specification should not be construed as a limitation to this application.

What is claimed is:

1. A method comprising:
   displaying, on a terminal device of a user, a virtual article presentation interface of an application program client running on the terminal device, wherein the user is logged into the application program client using a first account;
   receiving, from the terminal device, by using a network, a first virtual article identifier and the first account, the first virtual article identifier provided by the terminal device in response to an operation of the user on a virtual article presentation interface to purchase a first virtual article associated with the first virtual article identifier;
   in accordance with a determination, at a purchase platform associated with the virtual article presentation interface, that the user purchases the first virtual article for a first time on the purchase platform:
      calculating, by the application program server, a deadline according to a validity period of the first virtual article, wherein the deadline includes renewal time length information associated with the first order;
      establishing, by the application program server, a first association relationship between the first article identifier and the first account, and a second association relationship between the first article identifier and the deadline;
   generating and storing, at the application program server, a first order comprising the first virtual article identifier and the first account associated with the application program client;
   storing, at the application program server, the first association relationship and the second associate relationship;
   obtaining, from the purchase platform, by using the network, a virtual bill automatically generated by the purchase platform based on the deadline;
   in response to a determination that the first virtual article is to be renewed:
      updating the deadline of the first virtual article by adding a purchase time length to the deadline to complete a renewal operation on the first virtual article on the application program server and to implement a cross-platform asynchronous renewal operation between the application program server and the purchase platform; and sending by the application program server to the terminal device, the first virtual article.

2. The method according to claim 1, further comprising: determining, among a plurality of stored orders, a second order corresponding to a current bill that includes:

obtaining a second account used to log into the application program client running on the terminal device when the current bill is received, the current bill comprising a second virtual article identifier; and searching a plurality of stored orders for an order matching a second virtual article identifier in the current bill and the second account as the second order.

3. The method according to claim 2, wherein the operation of determining a second order corresponding to the current bill in a plurality of stored orders comprises:

obtaining an original bill from the current bill when it is determined according to the current bill that the current bill is not a bill of a first time of purchase after the user subscribes to automatically purchase the virtual article; and determining an order associated with the original bill in the plurality of stored orders as the second order, wherein the original bill is a bill corresponding to the first time of purchasing the virtual article after the user subscribes to automatically purchase the virtual article.

4. The method according to claim 2, further comprising:

obtaining, when it is determined that the second order has not been found in the plurality of orders, a third account and a third order that correspond to the current bill from configuration information, associating the current bill with the third order; and sending the virtual article corresponding to the second virtual article identifier in the current bill to the third account.

5. The method according to claim 2, further comprising:

associating, when the account in the second order is inconsistent with the second account in the current bill and it is determined that the current bill satisfies a preset condition, the current bill with the second account; and sending the virtual article corresponding to the second virtual article identifier in the current bill to the second account.

6. The method according to claim 5, wherein the determining that the current bill satisfies a preset condition comprises:

obtaining a first time in the current bill;

obtaining a second time in a latest bill associated with the second order;

searching, when a time interval between the first time and the second time exceeds a preset time length corresponding to the second virtual article identifier, the plurality of stored orders for a third order matching the second virtual article identifier in the current bill and the second account;

removing an association relationship between an original bill in the current bill and the second order, associating the current bill and the original bill with the third order; and determining that the current bill satisfies the preset condition, wherein the original bill is a bill corresponding to the first time of purchasing the virtual article after the user subscribes to automatically purchase the virtual article.

7. The method according to claim 5, wherein the operation of determining that the current bill satisfies a preset condition comprises:

recording a quantity of times of continuously receiving the current bill sent by the terminal device by using the second account; and determining, when the recorded quantity of times reaches a preset quantity of times, that the current bill satisfies the preset condition.

8. The method according to claim 2, further comprising: judging whether the current bill has been used; and after it is determined that the current bill has not been used, performing the step of determining the second order corresponding to the current bill in the plurality of stored orders.

9. The method according to claim 8, further comprising:

marking, after a virtual article corresponding to a virtual article identifier in a second bill is sent to a fourth account, the second bill as being in a used state, and storing the second bill, wherein the judging whether the current bill has been used further comprises:

searching stored bills for a bill having an identifier same as that of the current bill;

determining, when the found bill is marked as being in the used state, that the current bill has been used; and determining, when the bill has not been found or the found bill is not marked as being in the used state, that the current bill has not been used.

10. The method according to claim 8, further comprising:

associating, after a virtual article corresponding to a virtual article identifier in a second bill is sent to a fourth account corresponding to a fourth order, the second bill with the fourth order, wherein the judging whether the current bill has been used further comprises:

searching bills associated with the plurality of stored orders for a bill having an identifier same as that of the current bill;

determining, when the bill has been found, that the current bill has been used; and determining, when the bill has not been found, that the current bill has not been used.

11. An application program server, comprising: one or more processors and memory, and a plurality of computer readable instructions stored in the memory that, when executed by the one or more processors, cause the application program server to perform a plurality of operations including:

displaying, on a terminal device of a user, a virtual article presentation interface of an application program client running on the terminal device, wherein the user is logged into the application program client using a first account;

receiving, from the terminal device, by using a network, a first virtual article identifier and the first account, the first virtual article identifier provided by the terminal device in response to an operation of the user on a virtual article presentation interface to purchase a first virtual article associated with the first virtual article identifier;

in accordance with a determination, at a purchase platform associated with the virtual article presentation interface, that the user purchases the first virtual article for a first time on the purchase platform:

calculating, by the application program server, a deadline according to a validity period of the first virtual article, wherein the deadline includes renewal time length information associated with the first order;
establishing, by the application program server, a first association relationship between the first article identifier and the first account, and a second association relationship between the first article identifier and the deadline;
generating and storing, at the application program server, a first order comprising the first virtual article identifier and the first account associated with the application program client;
storing, at the application program server, the first association relationship and the second associate relationship;
obtaining, from the purchase platform, by using the network, a virtual bill automatically generated by the purchase platform based on the deadline;
in response to a determination that the first virtual article is to be renewed:
updating the deadline of the first virtual article by adding a purchase time length to the deadline to complete a renewal operation on the first virtual article on the application program server and to implement a cross-platform asynchronous renewal operation between the application program server and the purchase platform; and
sending, by the application program server to the terminal device, the first virtual article.

12. The application program server according to claim 11, further comprising: determining, among a plurality of stored orders, a second order corresponding to a current bill that includes:
obtaining a second account used to log into the application program client running on the terminal device when the current bill is received, the current bill comprising a second virtual article identifier; and
searching a plurality of stored orders for an order matching a second virtual article identifier in the current bill and the second account as the second order.

13. The application program server according to claim 12, wherein the operation of determining a second order corresponding to the current bill in a plurality of stored orders comprises:
obtaining an original bill from the current bill when it is determined according to the current bill that the current bill is not a bill of a first time of purchase after the user subscribes to automatically purchase the virtual article; and
determining an order associated with the original bill in the plurality of stored orders as the second order, wherein the original bill is a bill corresponding to the first time of purchasing the virtual article after the user subscribes to automatically purchase the virtual article.

14. The application program server according to claim 12, wherein the plurality of operations further comprise:
obtaining, when it is determined that the second order has not been found in the plurality of orders, a third account and a third order that correspond to the current bill from configuration information, associating the current bill with the third order; and
sending the virtual article corresponding to the second virtual article identifier in the current bill to the third account.

15. The application program server according to claim 12, wherein the plurality of operations further comprise:
associating, when the account in the second order is inconsistent with the second account in the current bill and it is determined that the current bill satisfies a preset condition, the current bill with the second account; and
sending the virtual article corresponding to the second virtual article identifier in the current bill to the second account.

16. The application program server according to claim 11, wherein the plurality of operations further comprise:
judging whether the current bill has been used; and
after it is determined that the current bill has not been used, performing the step of determining the second order corresponding to the current bill in the plurality of stored orders.

17. A non-transitory computer readable storage medium storing a plurality of instructions in connection with an application program server having one or more processors, wherein the plurality of instructions, when executed by the one or more processors, cause the application program server to perform a plurality of operations including:
displaying, on a terminal device of a user, a virtual article presentation interface of an application program client running on the terminal device, wherein the user is logged into the application program client using a first account;
receiving, from the terminal device, by using a network, a first virtual article identifier and the first account, the first virtual article identifier provided by the terminal device in response to an operation of the user on a virtual article presentation interface to purchase a first virtual article associated with the first virtual article identifier;
in accordance with a determination, at a purchase platform associated with the virtual article presentation interface, that the user purchases the first virtual article for a first time on the purchase platform:
calculating, by the application program server, a deadline according to a validity period of the first virtual article, wherein the deadline includes renewal time length information associated with the first order;
establishing, by the application program server, a first association relationship between the first article identifier and the first account, and a second association relationship between the first article identifier and the deadline;
generating and storing, at the application program server, a first order comprising the first virtual article identifier and the first account associated with the application program client;
storing, at the application program server, the first association relationship and the second associate relationship;
obtaining, from the purchase platform, by using the network, a virtual bill automatically generated by the purchase platform based on the deadline;
in response to a determination that the first virtual article is to be renewed:
updating the deadline of the first virtual article by adding a purchase time length to the deadline to complete a renewal operation on the first virtual article on the application program server and to implement a cross-platform asynchronous renewal operation between the application program server and the purchase platform; and
sending, by the application program server to the terminal device, the first virtual article.

18. The non-transitory computer readable storage medium according to claim 17, wherein the plurality of operations further comprise:
- obtaining, when it is determined that the second order has not been found in the plurality of orders, a third account and a third order that correspond to the current bill from configuration information, associating the current bill with the third order; and
- sending the virtual article corresponding to the second virtual article identifier in the current bill to the third account.

19. The non-transitory computer readable storage medium according to claim 17, wherein the plurality of operations further comprise:
- associating, when the account in the second order is inconsistent with the second account in the current bill and it is determined that the current bill satisfies a preset condition, the current bill with the second account; and
- sending the virtual article corresponding to the second virtual article identifier in the current bill to the second account.

20. The non-transitory computer readable storage medium according to claim 17, wherein the plurality of operations further comprise:
- judging whether the current bill has been used; and
- after it is determined that the current bill has not been used, performing the step of determining the second order corresponding to the current bill in the plurality of stored orders.

\* \* \* \* \*